(12) United States Patent
Kim et al.

(10) Patent No.: US 11,249,838 B2
(45) Date of Patent: Feb. 15, 2022

(54) MEMORY SYSTEM, MEMORY CONTROLLER, AND METHOD OF OPERATING MEMORY CONTROLLER

(71) Applicant: SK hynix Inc., Gyeonggi-do (KR)

(72) Inventors: Se Joong Kim, Gyeonggi-do (KR); Min Hwan Moon, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/846,479

(22) Filed: Apr. 13, 2020

(65) Prior Publication Data

US 2021/0124642 A1    Apr. 29, 2021

(30) Foreign Application Priority Data

Oct. 29, 2019   (KR) .......................... 10-2019-0135001

(51) Int. Cl.
*G06F 11/10*   (2006.01)
(52) U.S. Cl.
CPC ...... *G06F 11/1004* (2013.01); *G06F 11/1068* (2013.01)
(58) Field of Classification Search
CPC .......................... G06F 11/1004; G06F 11/1068

USPC .......................................................... 714/19
See application file for complete search history.

(56) References Cited

U.S. PATENT DOCUMENTS

| 2018/0143877 | A1* | 5/2018 | Yang ....................... G11C 16/26 |
| 2020/0110661 | A1* | 4/2020 | Singidi ................. G06F 3/0658 |

FOREIGN PATENT DOCUMENTS

| KR | 10-2007-0046835 | 5/2007 |
| KR | 10-2018-0059197 | 6/2018 |

* cited by examiner

*Primary Examiner* — Yair Leibovich
(74) *Attorney, Agent, or Firm* — IP & T Group LLP

(57) ABSTRACT

Embodiments relate to a memory system, a memory controller, and a method of operating the same, wherein a plurality of super memory blocks are set, a parity for data stored in the first super memory block is calculated, the calculated parity is stored in a parity buffer, and the parity stored in the parity buffer is written to one of a plurality of parity blocks included in a memory device. Thus, it is possible to solve the problem that the time for writing data to the memory device is delayed due to the time for calculating the parity, and to efficiently manage the parities stored in the memory device.

20 Claims, 21 Drawing Sheets

*FIG.14*

| SUB_D1 | 0b1010 |
|---|---|
| SUB_D2 | 0b1101 |
| SUB_D3 | 0b0100 |
| PARITY = (SUB_D1) XOR (SUB_D2) XOR (SUB_D3) | (0b1010) XOR (0b1101) XOR (0b0100) = (0b0011) |
| SUB_D1 = (SUB_D2) XOR (SUB_D3) XOR (PARITY) | (0b1101) XOR (0b0100) XOR (0b0011) = (0b1010) |

MEMORY SYSTEM, MEMORY CONTROLLER, AND METHOD OF OPERATING MEMORY CONTROLLER

CROSS REFERENCE TO RELATED APPLICATION

The present application claims priority under 35 U.S.C. 119(a) to Korean patent application number 10-2019-0135001 filed on Oct. 29, 2019, which is incorporated herein by reference in its entirety.

BACKGROUND OF THE INVENTION

1. Field of the Invention

Various embodiments relate to a memory system, a memory controller, and a method of operating the same.

2. Description of the Prior Art

A memory system corresponding to a storage device is a device for storing data, based on a request from a host such as a computer, a mobile terminal such as a smart phone or a tablet PC, or various electronic devices. The memory system may include not only a device for storing data in a magnetic disc, such as a hard disk drive (HDD), but also a device for storing data in a nonvolatile memory, such as a solid state drive (SSD), a universal flash storage (UFS) device, or an embedded MMC (eMMC).

The memory system may further include a memory controller for controlling a memory device (e.g., a volatile memory or a nonvolatile memory), and the memory controller may receive a command from a host and may execute or control operations for reading, writing, or erasing data for the memory device included therein, based on the received command. Then, the memory controller may drive firmware for performing logical operations to execute or control these operations.

Meanwhile, when writing data to the memory device, the memory system may check whether an error occurs in the data, and when an error occurs in the data, the memory system may write parity to be used to restore the data to the state before the error occurred to the memory device.

SUMMARY OF THE INVENTION

The embodiments may provide a memory system, a memory controller, and a method of operating the same, capable of solving a problem in which a time for writing data to a memory device is delayed due to a time for calculating parity.

In addition, embodiments may provide a memory system, a memory controller, and a method of operating the same, capable of efficiently managing parity stored in a memory device.

In an aspect, embodiments may provide a memory system including a plurality of memory dies each including at least one of a plurality of memory blocks and a memory controller configured to control the plurality of memory dies.

The memory controller may set a plurality of super memory blocks from the plurality of memory blocks.

The memory controller may calculate a first parity having a size equal to that of one sub-data with respect to data stored as a plurality of sub-data in a selected first super memory block of the plurality of super memory blocks.

In this case, the value of I-th bit, where I is a natural number of the first parity may be a value obtained by performing an XOR operation on the I-th bit values of respective sub-data of the plurality of sub-data.

The memory controller may store the first parity in a parity buffer configured to store one or more parities.

When the number of parities stored in the parity buffer is equal to or greater than a first set value, the memory controller may write the first parity stored in the parity buffer to a first parity block among a plurality of parity blocks configured to store parities.

In this case, each of the plurality of parity blocks may be one of the plurality of super memory blocks, in which the first parity block may be a second super memory block different from the first super memory block among the plurality of super memory blocks.

The memory controller may set a parity map that includes a set of parity map entries. In this case, each of the parity map entries may indicate a location of the parities within the parity blocks and corresponding data within the super memory blocks.

After writing the first parity to the first parity block, the memory controller may update a parity map entry corresponding to the first parity among a set of parity map entries.

The memory controller may set a valid parity table including flag information indicating whether a parity corresponding to each parity map entry included in the parity map is valid. In addition, the memory controller may update the flag information corresponding to the first parity in the valid parity table.

When an uncorrectable ECC (UECC) occurs in the first sub data among the plurality of sub-data, the memory controller may restore the first sub-data, based on i) first parity and ii) remaining sub-data except for the first sub-data among the plurality of sub-data.

The memory controller performs an XOR operation on the I-th bit value, where I is a natural number, of the first parity and I-th bit values of the remaining sub-data except for the first sub-data among the plurality of sub-data, thereby restoring the I-th bit value of the first sub-data.

When the number of free parity blocks among the plurality of parity blocks is equal to or less than a second set value, the memory controller may migrate valid parities among parities stored in at least one victim parity block among the plurality of parity blocks to a target parity block of one of the plurality of parity blocks.

The memory controller may migrate the valid parity by selecting the victim parity block, based on the number of invalid parities among parities stored in each of the plurality of parity blocks.

The memory controller may erase the victim parity block after migrating valid parities among the parities stored in the victim parity block to a target parity block.

In another aspect, embodiments may provide a memory controller including a control circuit for controlling a plurality of memory dies each including at least one of a plurality of memory blocks.

The control circuit may set a plurality of super memory blocks from the plurality of memory blocks.

The control circuit may calculate, for data stored as a plurality of sub-data in a selected first super memory block of the plurality of super memory blocks, a first parity that is a parity having a size equal to that of the sub-data.

In this case, the value of I-th bit, where I is a natural number, of the first parity may be a value obtained by performing an XOR operation on respective I-th bit values of the plurality of sub-data.

The control circuit may store the first parity in a parity buffer configured to store one or more parities.

When the number of parities stored in the parity buffer is equal to or greater than a first set value, the control circuit may write the first parity stored in the parity buffer to a first parity block among a plurality of parity blocks configured to store parities.

A method of operating a memory controller may include a step of setting a plurality of super memory blocks from a plurality of memory blocks.

The method of operating a memory controller may include a step of calculating a first parity having a size equal to that of one sub-data with respect to data stored as a plurality of sub-data in a first super memory block of the plurality of super memory blocks.

The method of operating a memory controller may include a step of storing the first parity in a parity buffer configured to store one or more parities.

The method of operating a memory controller may include a step of writing the first parity stored in the parity buffer to a first parity block among a plurality of parity blocks configured to store parities when the number of parities stored in the parity buffer is equal to or greater than a first set value.

In an aspect, embodiments may provide a memory system including a memory device including a group of memory regions and a parity region, a parity buffer and a controller.

The controller may control the memory device to store data into the group while generating a parity for the data and buffering the parity into the parity buffer.

The controller may control the memory device to store the buffered parity into the parity region.

According to embodiments, it is possible to solve a problem in which a time for writing data to a memory device is delayed due to a time for calculating parity.

In addition, according to embodiments, it is possible to efficiently manage parity stored in a memory device.

BRIEF DESCRIPTION OF THE DRAWINGS

The above and other aspects, features and advantages of the present disclosure will be more apparent from the following detailed description taken in conjunction with the accompanying drawings, in which:

FIG. 14 is a diagram illustrating an operation in which the memory system restores first sub-data in which a UECC occurs according to various embodiments of the present disclosure;

DETAILED DESCRIPTION

Hereinafter, embodiments will be described in detail with reference to the accompanying drawings.

Figure 1:
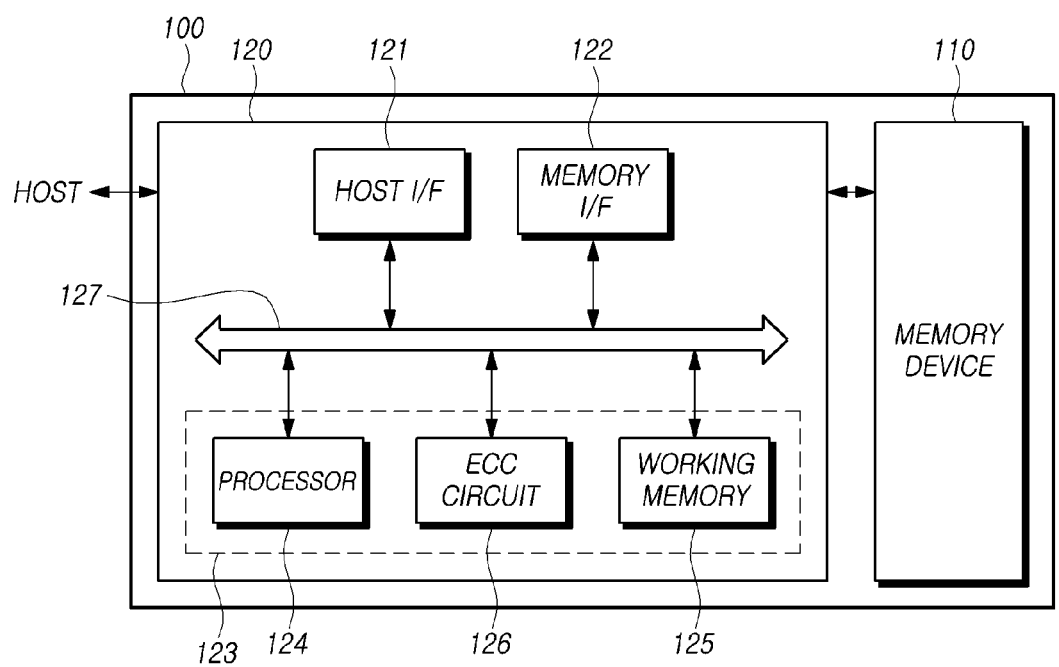
FIG. 1 is diagram schematically illustrating the configuration of a memory system according to various embodiments of the present disclosure.

FIG. 1 is diagram schematically illustrating the configuration of a memory system 100 according to various embodiments of the present disclosure.

Referring to FIG. 1, the memory system 100 may include, for example, a memory device 110 configured to store data and a memory controller 120 configured to control the memory device 110.

The memory device 110 includes a plurality of memory blocks and operates in response to the control of the memory controller 120. Here, the operation of the memory device 110 may include, for example, a read operation, a program operation (also referred to as a "write operation"), and an erase operation.

The memory device 110 may include a memory cell array including a plurality of memory cells (also referred to simply as "cells") for storing data. Such a memory cell array may exist within a memory block.

For example, the memory device 110 may implemented as various types using, for example, double data rate synchronous dynamic random access memory (DDR SDRAM), low power double data rate 4 (LPDDR4) SDRAM, graphics double data rate (GDDR) SDRAM, low power DDR (LPDDR), rambus dynamic random access memory (RDRAM), NAND Flash Memory, 3D NAND flash memory, NOR flash memory, resistive random access memory (RRAM), phase-change random access memory (PRAM), magnetoresistive random access memory (MRAM), ferroelectric random access memory (FRAM), or spin transfer torque random access memory (STT-RAM).

Moreover, the memory device 110 may be implemented in a three-dimensional array structure. The embodiments are also applicable not only to a flash memory device in which a charge storage layer is formed of a conductive floating gate, but also to a charge trap flash (CTF) in which a charge storage layer is formed of an insulating film.

The memory device 110 is configured to receive, for example, a command and an address from the memory controller 120, and to access an area selected by the address in the memory cell array. That is, the memory device 110 may perform an operation corresponding to a command on the area selected by the address.

For example, the memory device 110 may perform, for example, a program operation, a read operation, or an erase operation. In this regard, during the program operation, the memory device 110 will program data in the area selected by the address. During the read operation, the memory device 110 will read data from the area selected by the address. During the erase operation, the memory device 110 will erase data from the area selected by the address.

The memory controller 120 may control write (program), read, erase, and background operations on the memory device 110. Here, the background operation may include, for example, at least one of garbage collection (GC) operation, wear leveling (WL) operation, or a bad block management (BBM) operation.

The memory controller 120 may control the operation of the memory device 110 according to a request from a host (HOST). Alternatively, the memory controller 120 may control the operation of the memory device 110 regardless of a request from the host (HOST).

Moreover, the memory controller 120 and the host (HOST) may be separate devices. In some cases, the memory controller 120 and the host (HOST) may be incorporated into and implemented as a single device. Hereinbelow, for convenience of description, an example in which the memory controller 120 and the host (HOST) are devices separated from each other will be described.

Referring to FIG. 1, the memory controller 120 may include, for example, a memory interface 122 and a control circuit 123, and may further include, for example, a host interface 121.

The host interface 121 provides an interface for communicating with the host (HOST).

When receiving a command from the host (HOST), the control circuit 123 may receive a command via the host interface 121 and may perform an operation of processing the received command.

The memory interface 122 is connected to the memory device 110 to provide an interface for communication with the memory device 110. That is, the memory interface 122 may be configured to provide an interface between the memory device 110 and the memory controller 120 in response to the control of the control circuit 123.

The control circuit 123 controls the operation of the memory device 110 by performing overall control operations of the memory controller 120. To this end, for example, the control circuit 123 may include one or more of, for example, a processor 124 and a working memory 125. In some cases, the control circuit 123 may further include, for example, an error detection and correction circuit (ECC circuit) 126.

The processor 124 may control overall operations of the memory controller 120 and perform logical operations. The processor 124 may communicate with the host (HOST) via the host interface 121 and may communicate with the memory device 110 via the memory interface 122.

The processor 124 may perform a function of a flash translation layer (FTL). The processor 124 may translate a logical block address (LBA) provided by the host into a physical block address (PBA) via the flash translation layer (FTL). The flash translation layer FTL may receive a logical block address LBA using a mapping table and may translate the logical block address LBA into a physical block address (PBA).

There are several methods of mapping the address of a flash translation layer depending on a mapping unit. Representative address mapping methods include a page mapping method, a block mapping method, and a hybrid mapping method.

The processor 124 is configured to randomize data received from the host (HOST). For example, the processor 124 will randomize the data received from the host (HOST) using a randomizing seed. The randomized data is provided to the memory device 110 as data to be stored and is programmed in the memory cell array.

The processor 124 is configured to derandomize data received from the memory device 110 during the read operation. For example, the processor 124 will derandomize the data received from the memory device 110 using a derandomizing seed. The derandomized data will be output to the host (HOST).

The processor 124 may control the operation of the memory controller 120 by executing firmware. In other words, the processor 124 may execute (drive) firmware loaded in the working memory 125 at boot time in order to control overall operations of the memory controller 120 and to perform logical operations.

The firmware is a program executed in the memory system 100, and may include various functional layers.

For example, the firmware may include at least one of a flash translation layer (FTL) for translation between a logical address requested by the host (HOST) from the memory system 100 and a physical address of the memory device 110, a host interface layer (HIL), which interprets a command requested by the host (HOST) from the memory system 100, which is a storage device, and transmits the command to the flash translation layer (FTL), and a flash interface layer (FIL), which transmits a command rendered by the flash translation layer FTL to the memory device 110.

For example, the firmware may be stored in the memory device 110 and may then be loaded into the working memory 125.

The working memory 125 may store firmware, program codes, commands, or data necessary for driving the memory controller 120. The working memory 125 may include at least one of, for example, static RAM (SRAM), dynamic RAM (DRAM), and synchronous DRAM (SDRAM), as volatile memory.

The error detection and correction circuit 126 may be configured to detect an error bit of data to be checked using an error correction code and correct the detected error bit. Here, the data to be checked may be, for example, data stored in the working memory 125 or data read from the memory device 110.

The error detection and correction circuit 126 may be implemented to decode data with an error correction code. The error detection and correction circuit 126 may be implemented with various code decoders. For example, a decoder that performs unsystematic code decoding or a decoder that performs systematic code decoding may be used.

For example, the error detection and correction circuit 126 may detect an error bit in sector units for each read data. That is, each read data may be composed of a plurality of sectors. A sector may mean a data unit smaller than a page, which is a read unit of flash memory. Sectors constituting each read data may correspond to each other via addresses.

The error detection and correction circuit 126 may calculate a bit error rate (BER) and may determine whether correction is possible in sector units. For example, when a bit error rate (BER) is higher than a reference value, the error detection and correction circuit 126 will determine the corresponding sector as uncorrectable or a fail. In contrast, when the bit error rate (BER) is lower than the reference value, the corresponding sector will be determined as correctable or a pass.

The error detection and correction circuit 126 may sequentially perform error detection and correction operations on all read data. When a sector included in the read data is correctable, the error detection and correction circuit 126 may omit the error detection and correction operation on the corresponding sector for the next read data. When the error detection and correction operations for all read data are finished in this way, the error detection and correction circuit 126 may detect a sector determined as uncorrectable until the end. There may be one or more sectors determined as uncorrectable. The error detection and correction circuit 126 may transmit information about the sectors determined as uncorrectable (e.g., address information) to the processor 124.

The bus 127 may be configured to provide a channel between the components 121, 122, 124, 125, and 126 of the memory controller 120. The bus 127 may include, for example, a control bus for transmitting, for example, various control signals and commands, and a data bus for transferring various data.

The above-described components 121, 122, 124, 125, and 126 of the memory controller 120 are only examples. Some of the above-described components 121, 122, 124, 125, and 126 of the memory controller 120 may be deleted, or some of the above-described components 121, 122, 124, and 125 of the memory controller 120 may be integrated into one. In some cases, one or more other components may be added to the above-described components of the memory controller 120.

Hereinafter, the memory device 110 will be described in more detail with reference to FIG. 2.

Figure 2:
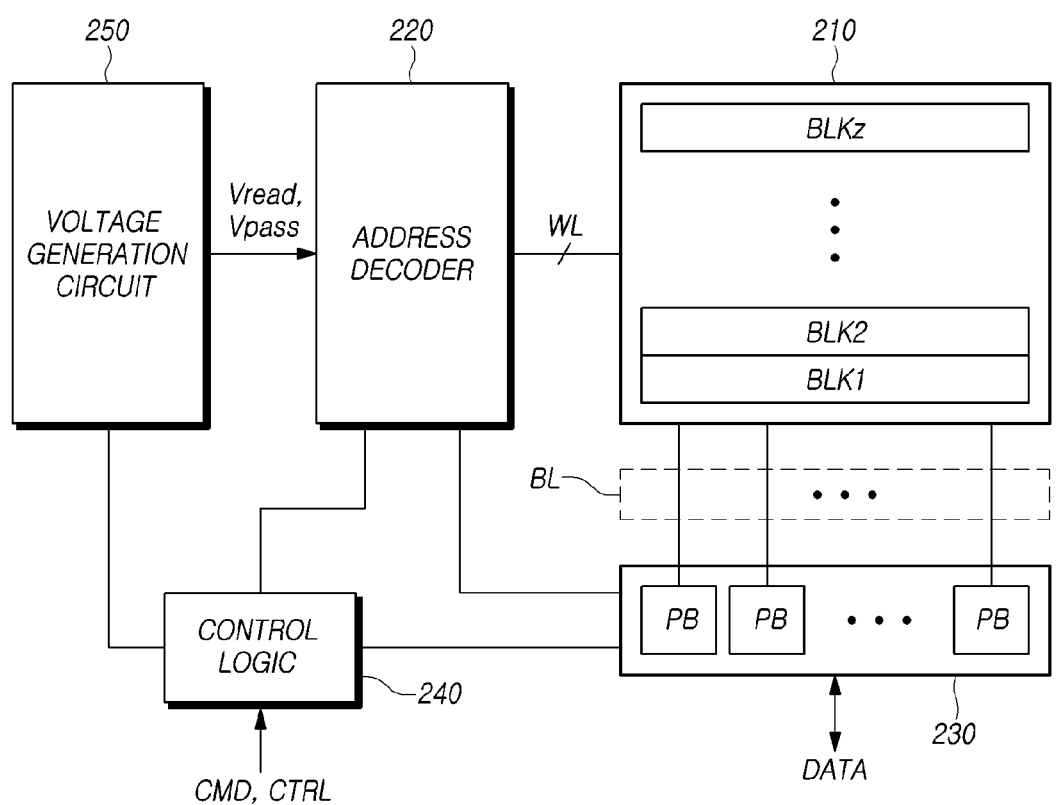
FIG. 2 is a block diagram schematically illustrating a memory device according to various embodiments of the present disclosure.

FIG. 2 is a block diagram schematically illustrating a memory device 110 according to various embodiments of the present disclosure.

Referring to FIG. 2, the memory device 110 according to example embodiments may include, for example, a memory cell array 210, an address decoder 220, a read and write circuit 230, a control logic 240, and a voltage generation circuit 250.

The memory cell array 210 may include a plurality of memory blocks BLK1 to BLKz (in which z is a natural number of two or more).

In the plurality of memory blocks BLK1 to BLKz, a plurality of word lines WL and a plurality of bit lines BL may be disposed, and a plurality of memory cells MC may be arranged.

The plurality of memory blocks BLK1 to BLKz may be connected to the address decoder 220 via the plurality of word lines WL. The plurality of memory blocks BLK1 to BLKz may be connected to the read and write circuit 230 via the plurality of bit lines BL.

Each of the plurality of memory blocks BLK1 to BLKz may include a plurality of memory cells. For example, the plurality of memory cells are nonvolatile memory cells, and may be composed of nonvolatile memory cells having a vertical channel structure.

The memory cell array 210 may be configured as a memory cell array having a two-dimensional structure, and in some cases, may be configured as a memory cell array having a three-dimensional structure.

Moreover, each of the plurality of memory cells included in the memory cell array 210 may store at least 1 bit data. As an example, each of the plurality of memory cells included in the memory cell array 210 may be a single-level cell (SLC) that stores 1-bit data. As another example, each of the plurality of memory cells included in the memory cell array 210 may be a multi-level cell (MLC) that stores 2-bit data. As still another example, each of the plurality of memory cells included in the memory cell array 210 may be a triple-level cell (TLC) that stores 3-bit data. As still another example, each of the plurality of memory cells included in the memory cell array 210 may be a quad-level cell (QLC) that stores 4-bit data. As yet another example, the memory cell array 210 may include a plurality of memory cells, each of which stores data of five or more bits.

Referring to FIG. 2, for example, the address decoder 220, the read and write circuit 230, the control logic 240, and the voltage generator circuit 250 may operate as a peripheral circuit that drives the memory cell array 210.

The address decoder 220 may be connected to the memory cell array 210 via a plurality of word lines WL.

The address decoder 220 may be configured to operate in response to the control of the control logic 240.

The address decoder 220 may receive addresses via an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read voltage application operation in the read operation, the address decoder 220 may apply the read voltage Vread to a selected word line WL in a selected memory block and may apply the pass voltage Vpass to the remaining unselected word lines WL.

During the program verification operation, the address decoder 220 may apply a verification voltage generated by the voltage generation circuit 250 to the selected word line WL in the selected memory block, and may apply the pass voltage Vpass to the remaining unselected word lines WL.

The address decoder 220 may be configured to decode a column address among the received addresses. The address decoder 220 may transmit the decoded column address to the read and write circuit 230.

The read operation and the program operation of the memory device 110 may be performed in page units. An address received when requesting a read operation and a program operation may include one or more of a block address, a row address, and a column address.

The address decoder 220 may select one memory block and one word line according to the block address and the row address. The column address may be decoded by the address decoder 220, and the decoded column address may be provided to the read and write circuit 230.

The address decoder 220 may include one or more of, for example, a block decoder, a row decoder, a column decoder, and an address buffer.

The read and write circuit 230 may include a plurality of page buffers PB. The read and write circuit 230 may operate as a "read circuit" during the read operation of the memory cell array 210 and may operate as a "write circuit" during the write operation.

The above-described read and write circuit 230 may also be referred to as a page buffer circuit or a data register circuit including a plurality of page buffers PB. Here, the read and write circuit 230 may include a data buffer for a data processing function, and in some cases, may further include a cache buffer for a caching function.

The plurality of page buffers PB may be connected to the memory cell array 210 via a plurality of bit lines BL. During a read operation and a program verification operation, in order to sense threshold voltages Vth of memory cells, the plurality of page buffers PB may sense the amount of current flowing according to the program state of a corresponding memory cell by the sensing node and may latch the sensed amount of current as sensing data while continuously supplying a sensing current to the bit lines BL connected to the memory cells.

The read and write circuit 230 may operate in response to page buffer control signals output from the control logic 240.

During the read operation, the read and write circuit 230 senses data of the memory cells, temporarily stores the read data, and then outputs data (DATA) to the input/output buffer of the memory device 110. In an exemplary embodiment, the read and write circuit 230 may include, for example, a column selection circuit, in addition to the page buffers PB or page registers.

The control logic 240 may be connected to, for example, the address decoder 220, the read and write circuit 230, and the voltage generation circuit 250. The control logic 240 may receive a command signal CMD and a control signal CTRL via the input/output buffer of the memory device 110.

The control logic 240 may be configured to control the overall operations of the memory device 110 in response to the control signal CTRL. The control logic 240 may output a control signal for adjusting the precharge potential level of the sensing node of the plurality of page buffers PB.

The control logic 240 may control the read and write circuit 230 to perform the read operation of the memory cell array 210. The voltage generation circuit 250 may generate the read voltage Vread and the pass voltage Vpass used in the read operation in response to the control signal of the voltage generation circuit output from the control logic 240.

Figure 3:
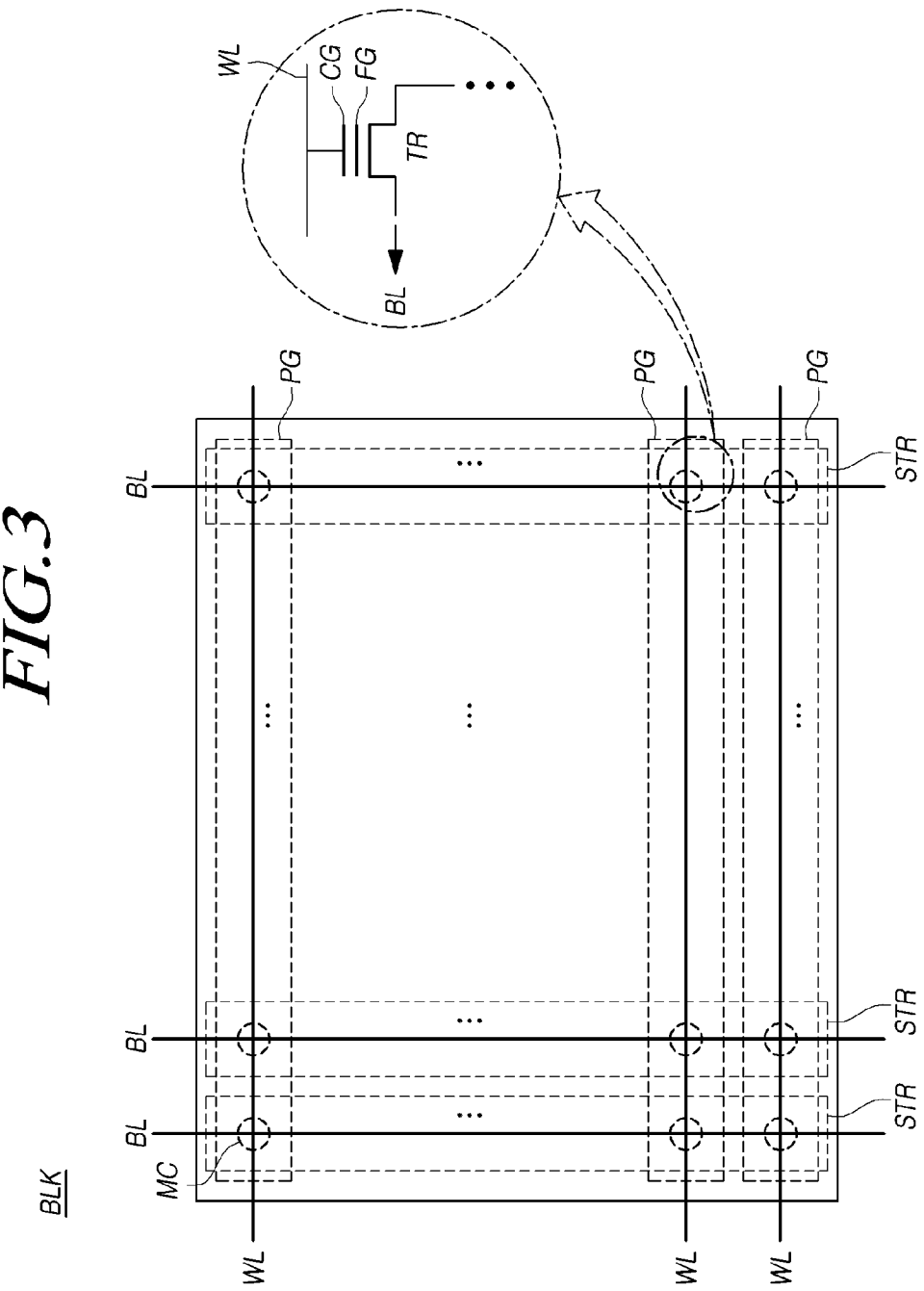
FIG. 3 is a view schematically illustrating each memory block of the memory device according to various embodiments of the present disclosure.

FIG. 3 is a diagram schematically illustrating each memory block of the memory device 110 according to various embodiments of the present disclosure.

Referring to FIG. 3, the memory block BLK included in the memory device 110 may be disposed in a direction in which a plurality of pages PG and a plurality of strings STR cross each other.

The plurality of pages PG correspond to the plurality of word lines WL, and the plurality of strings STR correspond to the plurality of bit lines BL.

In the memory block BLK, a plurality of word lines WL and a plurality of bit lines BL may be disposed to cross each other. For example, each of the plurality of word lines WL may be disposed in the row direction, and each of the plurality of bit lines BL may be disposed in the column direction. For example, each of the plurality of word lines WL may be disposed in the column direction, and each of the plurality of bit lines BL may be disposed in the row direction.

The plurality of word lines WL and the plurality of bit lines BL cross each other to define a plurality of memory cells MC. A transistor TR may be disposed in each memory cell MC.

For example, the transistor TR disposed in each memory cell MC may include, for example, a drain, a source, and a gate. The drain (or source) of the transistor TR may be connected to the corresponding bit line BL directly or via another transistor TR. The drain (or source) of the transistor TR may be connected to a source line (or a ground) directly or via another transistor TR. The gate of the transistor TR may include a floating gate (FG) surrounded by an insulator and a control gate (CG) to which a gate voltage is applied from a word line WL.

In each of the plurality of memory blocks BLK1 to BLKz, a first selection line (also referred to as a source selection line or a drain selection line) may be further disposed outside a first outermost word line closer to the read and write circuit 230 among two outermost word lines, and a second selection line (also referred to as a drain selection line or a source selection line) may be further disposed outside the other second outermost word line.

In some cases, one or more dummy word lines may be further disposed between the first outermost word line and the first selection line. In addition, one or more dummy word lines may be further disposed between the second outermost word line and the second selection line.

When having a memory block structure as illustrated in FIG. 3, the read operation and the program operation (the write operation) may be performed in page units, and the erase operation may be performed in memory block units.

Figure 4:
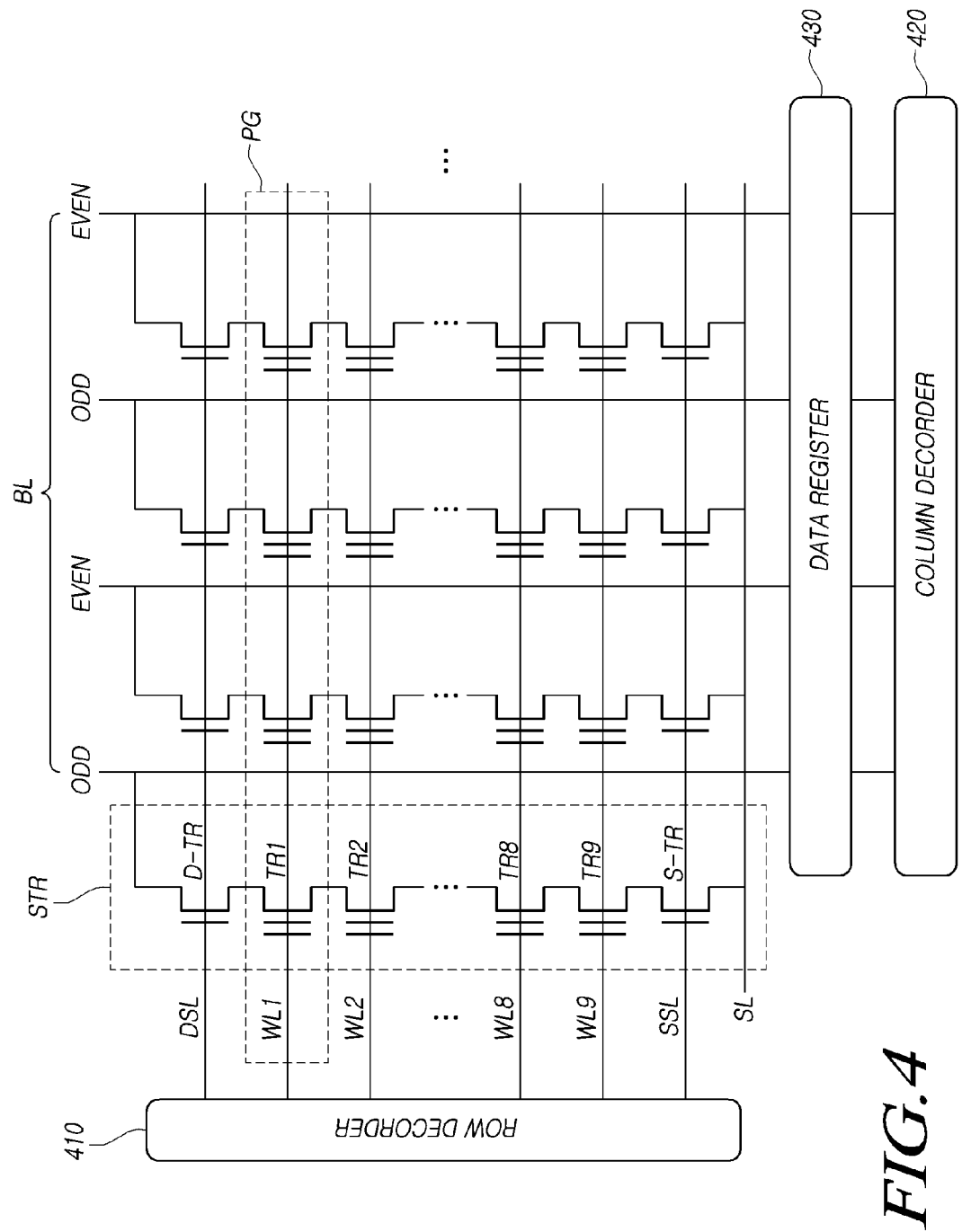
FIG. 4 is a diagram illustrating a structure of word lines WL and bit lines BL of the memory device according to various embodiments of the present disclosure.

FIG. 4 is a diagram illustrating a structure of word lines WL and bit lines BL of the memory device 110 according to various embodiments of the present disclosure.

Referring to FIGS. 2 and 4, in the memory device 110, a core area in which memory cells MC are positioned and an auxiliary area that corresponds to a remaining area other than the core area and supports the operation of the memory cell array 210, exist.

The core area may include pages PG and strings STR. In the core area, a plurality of word lines WL1 to WL9 and a plurality of bit lines BL are disposed to cross each other.

The plurality of word lines WL1 to WL9 may be connected to a row decoder 410, and the plurality of bit lines BL may be connected to a column decoder 420. A data register 430 corresponding to the read and write circuit 230 may exist between the plurality of bit lines BL and the column decoder 420.

The plurality of word lines WL1 to WL9 correspond to a plurality of pages PG.

For example, as illustrated in FIG. 4, each of the plurality of word lines WL1 to WL9 may correspond to one page PG. Alternatively, when each of the plurality of word lines WL1 to WL9 is large in size, each of the plurality of word lines WL1 to WL9 may correspond to two or more (e.g., two or four) pages PG. The page PG is a minimum unit in performing the program operation and the read operation. In the program operation and the read operation, all of the memory cells MC in the same page PG may perform the operations simultaneously.

The plurality of bit lines BL may be connected to the column decoder 420 in the state in which odd bit lines BL and even bit lines BL are distinguished from each other.

In order to access a memory cell MC, an address may first enter the core area through the row decoder 410 and the column decoder 420 via an input/output terminal, and may designate a target memory cell. The wording "designating a target memory cell" means that memory cells MC located at sites where the word lines WL1 to WL9 connected to the row decoder 410 and bit lines connected to the column decoder 420 cross each other are accessed in order to program data therein or to read programmed data therefrom.

Pages PG in a first direction (e.g., the X-axis direction) are tied to a commonly used line called a word line WL, and strings STR in a second direction (e.g., the Y-axis direction) are also tied (connected) to a common line called a bit line BL. The wording "commonly tied" means that pages or strings are structurally connected using the same material, and the same voltage is simultaneously applied thereto even when voltages are applied thereto. In the memory cells MC connected in series, a memory cell MC at the middle location or a memory cell MC at the last location is affected by the voltage drop of the previous memory cell MC, and thus the voltage applied to the first memory cell MC and the voltage applied to the last memory cell MC may be slightly different.

Since all data processing of the memory device 110 is programmed and read via the data register 430, the data register 430 plays a pivotal role. When the data processing of the data register 430 is late, all other areas should wait until the data register 430 completes the data processing. In addition, when the performance of the data register 430 is degraded, the overall performance of the memory device 110 may be degraded.

Referring to the example of FIG. 4, in one string STR, a plurality of transistors TR1 to TR9 connected to a plurality of word lines WL1 to WL9 may exist. The areas in which the plurality of transistors TR1 to TR9 exist correspond to memory cells MC. Here, the plurality of transistors TR1 to TR9 are transistors each including a control gate CG and a floating gate FG, as described above.

The plurality of word lines WL1 to WL9 include two outermost word lines WL1 and WL9. A first selection line DSL may be further disposed outside a first outermost word line WL1, which is closer to the data register 430 in terms of signal path among the two outermost word lines WL1 and WL9, and a second selection line SSL may be further disposed outside the other second outermost word line WL9.

A first selection transistor D-TR, ON-OFF of which is controlled by the first selection line DSL, is a transistor that has only a gate electrode connected to the first selection line DSL and does not include a floating gate FG. A second selection transistor S-TR, ON-OFF of which is controlled by the second selection line SSL, is a transistor that has only a gate electrode connected to the second selection line SSL and does not include a floating gate FG.

The first selection transistor D-TR serves as a switch to turn ON or OFF a connection between the corresponding string STR and the data register 430. The second selection transistor S-TR serves as a switch to turn ON or OFF a connection between the corresponding string STR and a source line SL. That is, the first selection transistor D-TR and the second selection transistor S-TR are located at opposite ends of the corresponding string STR, and serve as gatekeepers that connect and disconnect signals.

Since it is necessary to fill the target memory cell MC of a bit line BL to be programmed with electrons during the program operation, the memory system 100 applies a predetermined turn-ON voltage (Vcc) to the gate electrode of the first selection transistor D-TR to turn ON the first selection transistor D-TR and applies a predetermined turn-OFF voltage (e.g., 0V) to the gate electrode of the second selection transistor D-TR to turn OFF the second selection transistor S-TR.

In the read operation or the verification operation, the memory system 100 turns ON both the first selection transistor D-TR and the second selection transistor S-TR. Accordingly, since the current may pass through the string STR to the source line SL corresponding to the ground, the voltage level of the bit line BL may be measured. However, in the read operation, there may be a time difference in ON-OFF timing between the first selection transistor D-TR and the second selection transistor S-TR.

In the erase operation, the memory system 100 may supply a predetermined voltage (e.g., +20V) to the substrate via the source line SL. In the erase operation, the memory system 100 floats both the first selection transistor D-TR and the second selection transistor S-TR to create an infinite resistance. As a result, a structure is obtained in which the roles of the first select transistor D-TR and the second select transistor S-TR are eliminated, and electrons operate by a potential difference only between the floating gate FG and the substrate.

The memory system 100 may include a plurality of memory dies DIE_1, DIE_2, and DIE_3 to DIE_N including one or more of the plurality of memory blocks BLK. Hereinafter, a case in which the plurality of memory dies DIE_1, DIE_2, and DIE3 to DIE_N are included in the above-described memory device 110 will be described with reference to the following drawings as an example.

Figure 5:
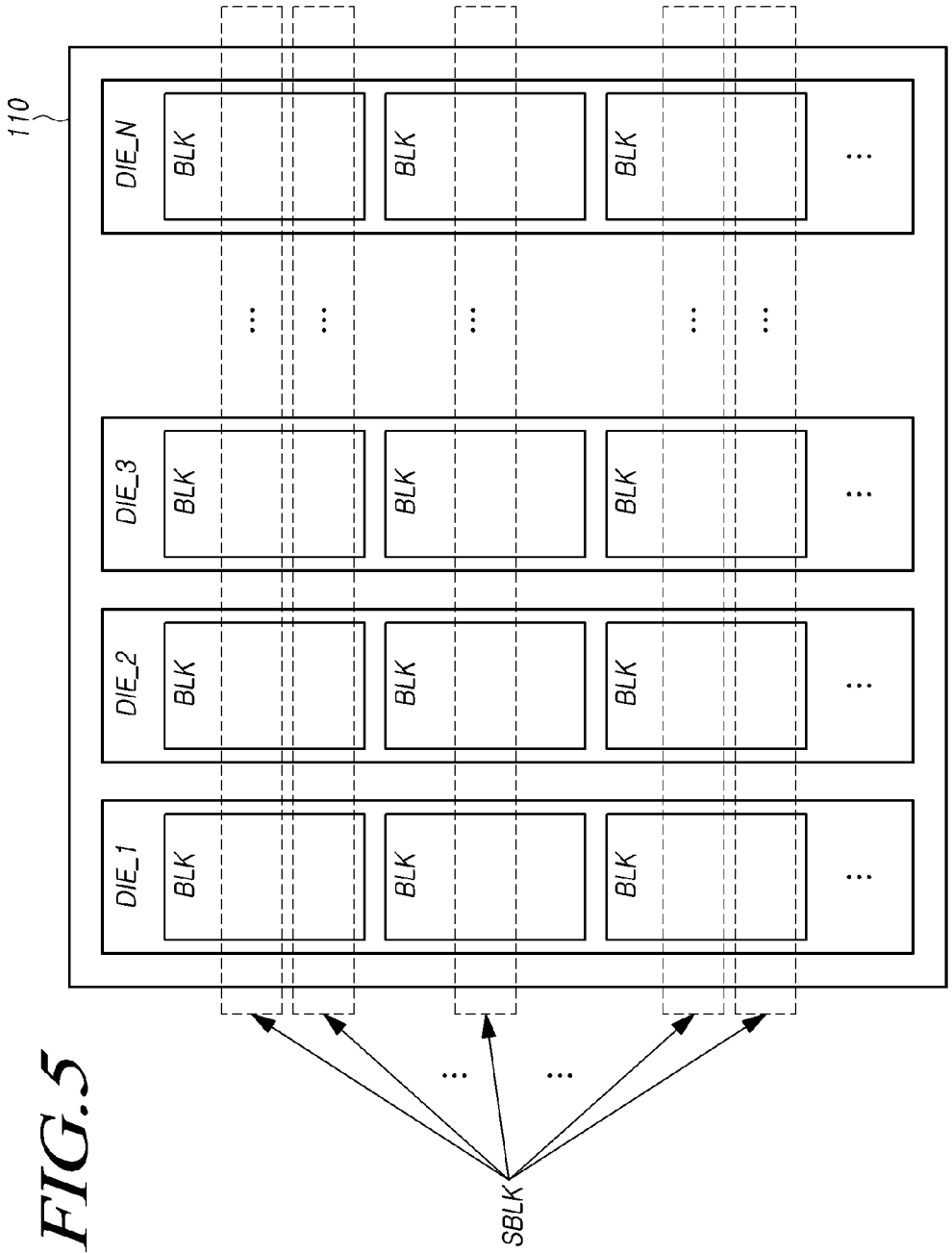
FIG. 5 is a diagram illustrating an exemplary operation of setting super memory blocks in a memory system according to various embodiments of the present disclosure.

FIG. 5 is a diagram illustrating an exemplary operation of setting super memory blocks SBLK in a memory system 100 according to embodiments.

Referring to FIG. 5, a memory device 110 included in the memory system 100 may include a plurality of memory dies DIE_1, DIE_2, and DIE_3 to DIE_N. In addition, each of the plurality of memory dies DIE_1, DIE_2, and DIE_3 to DIE_N may include one or more of a plurality of memory blocks BLK included in the memory device 110.

The memory controller 120 included in the memory system 100 may set a plurality of super memory blocks SBLK from the plurality of memory blocks BLK.

For example, the memory controller 120 may set a plurality of super memory blocks SBLK, each including portions of respective memory blocks included in different memory dies among the plurality of memory blocks BLK. In this case, a portion of a memory block included in any one of the plurality of super memory blocks SBLK may be referred to as a segment or a subunit of the memory block.

For example, the memory controller 120 may set one super memory block SBLK including a portion of one memory block BLK included in the memory die DIE_1, a portion of one memory block BLK included in the memory die DIE_2, a portion of one memory block BLK included in the memory die DIE_3, and a portion of one memory block BLK included in the memory die DIE_N.

When writing data to any one of the plurality of super memory blocks SBLK, the memory controller 120 may divide the data to be written and write, in parallel, the divided data to respective memory dies. That is, the memory controller 120 may divide the data to be written and may queue the divided data to queues corresponding to respective memory dies, and the memory device 110 may write, in parallel, the divided data queued in the queues corresponding to respective memory dies. The memory controller 120 is capable of improving write performance by writing data in parallel to the memory device 110.

When the memory controller 120 writes data to a super memory block SBLK as described above, some of the data written to the super memory block SBLK may be damaged for various reasons (e.g., degradation of the memory blocks included in the super memory block). In this case, a fail may occur when reading data written to the super memory block SBLK.

Accordingly, the memory controller 120 may calculate a parity for the data written in the super memory block SBLK and may store the calculated parity in the memory device 110 together with the data. If a fail occurs when reading data written to the super memory block SBLK, the memory controller 120 may restore the data using the parity for the data.

As described above, a method of storing a parity calculated by the memory controller 120 in the memory device 110 may be variously determined.

For example, the memory controller 120 may divide data stored in the first super memory block SBLK_1 among the plurality of super memory blocks SBLK described above into a plurality of sub-data, and may store the plurality of sub-data. Then, the memory controller 120 may calculate a first parity PARITY_1, which is a parity having the same size as that of the sub-data, with respect to the data stored as the plurality of sub-data in the first super memory block SBLK_1, and may store the calculated first parity PARITY_1 in the memory device 110.

In this case, the size of each of the plurality of sub-data and the size of the parity may be the size of one page (e.g., 4 KB or 8 KB) included in one of the plurality of memory blocks BLK included in the memory device 110.

Hereinafter, a method in which the memory controller 120 calculates the first parity PARITY_1 for data stored in the first super memory block SBLK_1 will be described.

The memory controller 120 may calculate the value of the I-th bit (I is a natural number) of the parity as a value obtained by performing an XOR operation on the I-th bit value of each of the plurality of sub-data described above.

As an example, 12-bit data stored in the first super memory block SBLK_1 is 0b101011010100, and that data is divided into three sub-data 0b1010, 0b1101, and 0b0100 in 4-bit units, which are stored in the first super memory block SBLK_1.

At this time, the first parity PARITY_1 is 4 bits, and each bit of the first parity PARITY_1 is calculated as follows.

The first bit of the first parity PARITY_1 is (1 XOR 1 XOR 0)=0, which is a value obtained by performing an XOR operation on 1, 1, and 0, which are the first bits of the three sub-data.

The second bit of the first parity PARITY_1 is (0 XOR 1 XOR 1)=0, which is a value obtained by performing an XOR operation on 0, 1, and 1, which are the second bits of the three sub-data.

The third bit of the first parity PARITY_1 is (1 XOR 0 XOR 0)=1, which is a value obtained by performing an XOR operation on 1, 0, and 0, which are the third bits of the three sub-data.

The fourth bit of the first parity PARITY_1 is (0 XOR 1 XOR 0)=1, which is a value obtained by performing an XOR operation on 0, 1, and 0, which are the fourth bits of the three sub-data.

Accordingly, the first parity PARITY_1 is calculated as 0b0011.

In the above, an example in which the memory controller 120 calculates a parity for data has been described.

Hereinafter, embodiments of an operation in which the memory controller 120 stores the above-described plurality of sub-data and parities in the memory device 110 will be described with reference to FIGS. 6 to 9.

Figure 6:
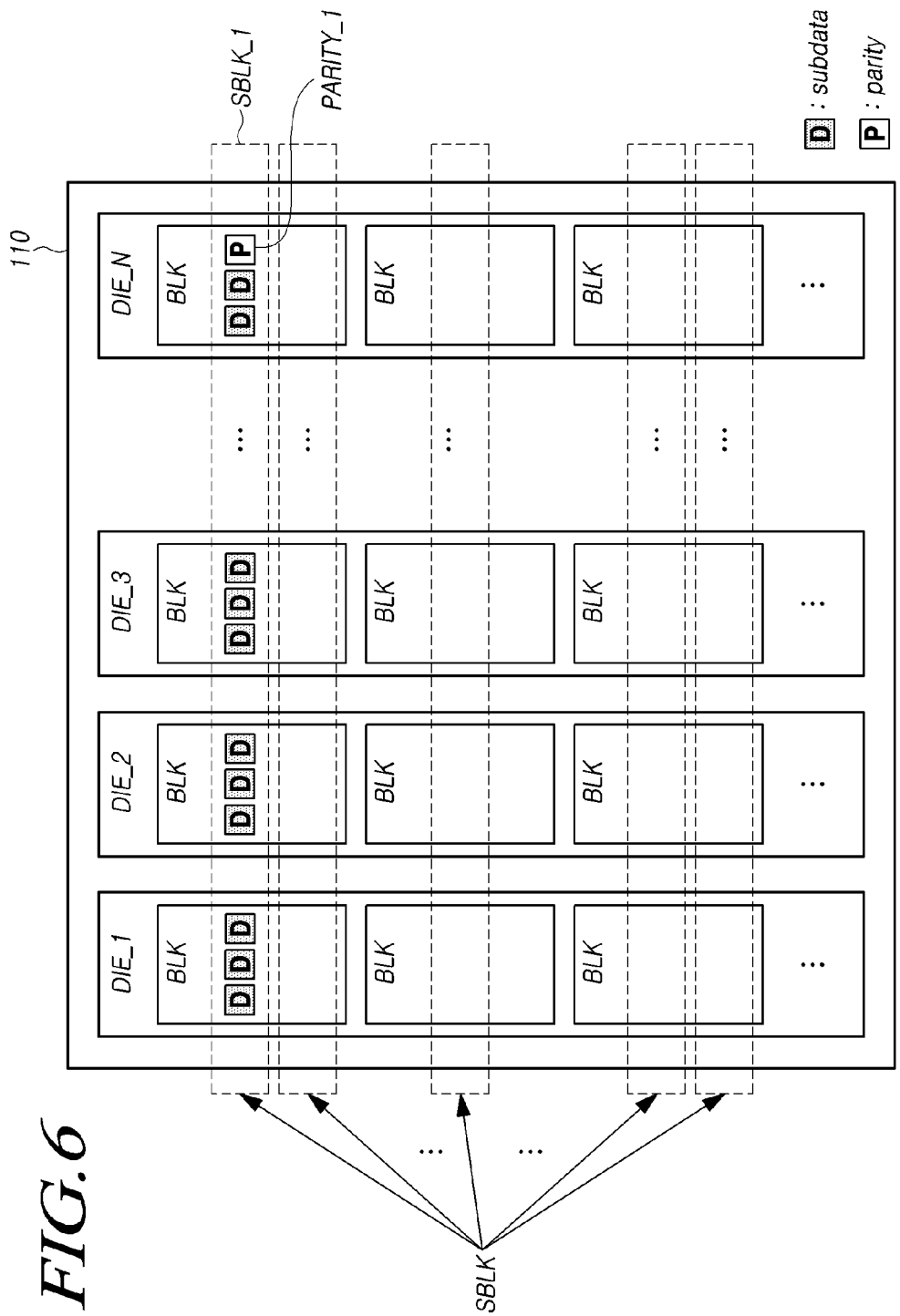
FIG. 6 is a diagram illustrating an exemplary operation of storing data and parities in a memory system according to various embodiments of the present disclosure.

FIG. 6 is a diagram illustrating an exemplary operation of storing data and parities in a memory system 100 according to embodiments.

Referring to FIG. 6, the memory controller 120 included in the memory system 100 may store data and a first parity PARITY_1, which is a parity for the data, together in a first super memory block SBLK_1 among a plurality of super memory blocks SBLK.

The memory controller 120 may divide data into plurality of sub-data and may store the plurality of sub-data in a block BLK included in each of the plurality of memory dies DIE_1, DIE_2, and DIE_3 to DIE_N. Then, the memory controller 120 may store the first parity PARITY_1 in a memory block BLK included in the memory die DIE_N.

When the memory controller 120 stores data and a parity together in the first super memory block SBLK_1, there is an advantage in that the memory controller 120 may access only the first super memory block SBLK_1 to read the data and the parity together.

However, when the memory controller 120 stores the data and the parity together in the first super memory block SBLK_1, there is a disadvantage in that the performance of a write operation on the memory die DIE_N including the memory block BLK in which the parity is stored may be degraded. This is because the memory controller 120 is capable of writing only after sub-data to be stored in the memory block BLK included in the memory die DIE_N and a parity for the entire data are calculated.

Accordingly, the memory controller 120 needs to quickly calculate the parity for the data in order to minimize performance degradation of the write operation on the memory die DIE_N. In order to quickly calculate the parity for the data, the memory controller 120 may use a separate XOR engine so as to quickly perform XOR operations between respective bits of data or may use a separate RAM device (e.g., SRAM) operating at a high speed to quickly access portions used to calculate the parity in the data. However, adding a separate XOR engine or a RAM device increases the overall cost of implementing the memory system 100.

In order to solve the above-described problem, instead of writing data and parity to the same super memory block, the memory controller 120 may write the parity to a different location from the super memory block to which the data is written in the memory device 110.

Figure 7:
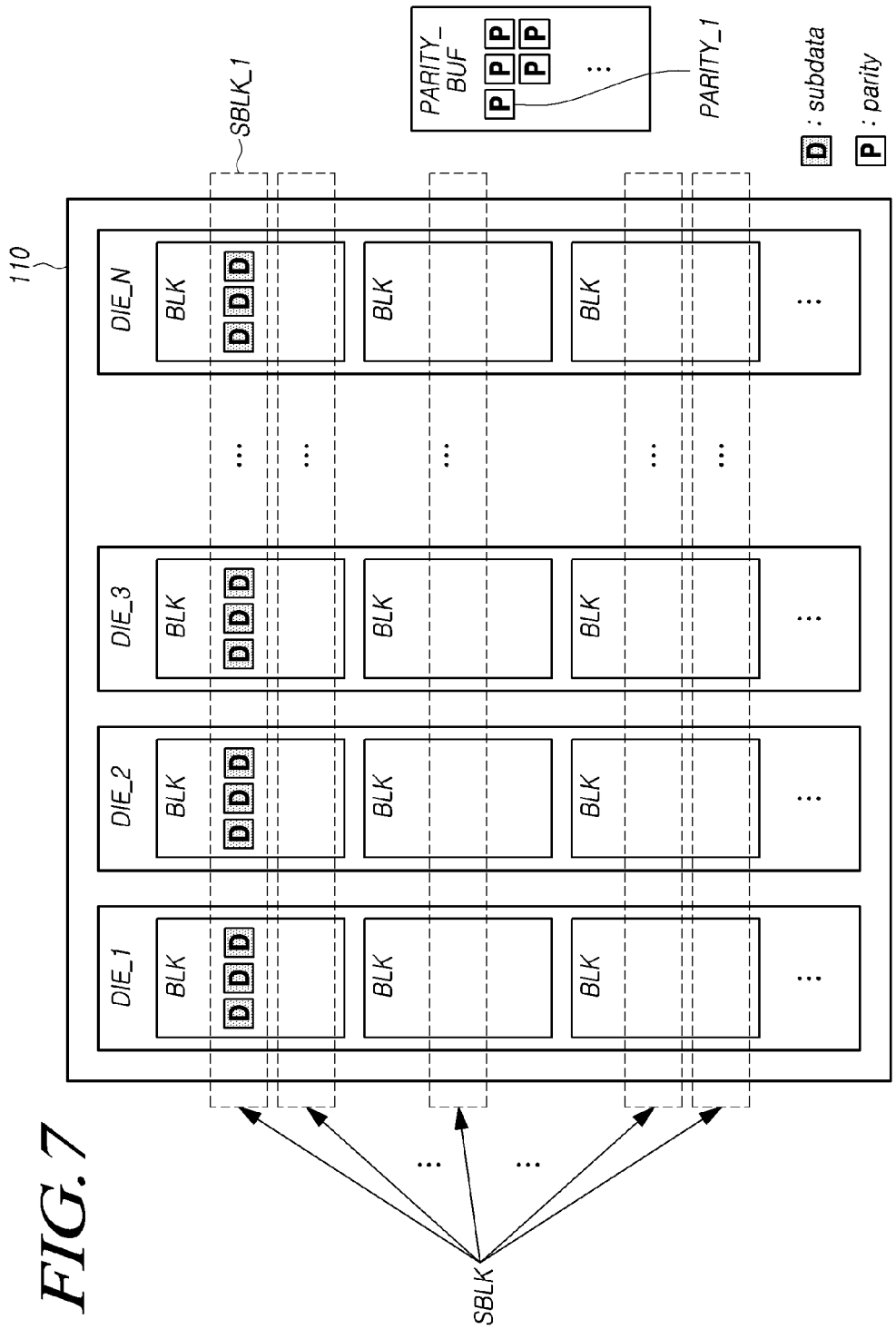
FIG. 7 is a diagram illustrating another exemplary operation of storing data and parities in a memory system according to various embodiments of the present disclosure.

FIG. 7 is a diagram illustrating another exemplary operation of storing data and parities in a memory system 100 according to various embodiments of the present disclosure.

Referring to FIG. 7, the memory controller 120 included in the memory system 100 may write data to a first super memory block SBLK_1 among a plurality of super memory blocks SBLK. In this case, as in FIG. 6, the memory controller 120 may divide the data into a plurality of sub-data and may store the sub-data.

Then, as in FIG. 6, the memory controller 120 may calculate the first parity PARITY_1, which is a parity having the same size as that of the sub-data, with respect to the data written to the first super memory block SBLK_1. In this case, the memory controller 120 may store the calculated first parity PARITY_1 in the parity buffer PARITY_BUF configured to store one or more parities.

In this case, the parity buffer PARITY_BUF may be located on the working memory 125 of the memory controller 120. The parity buffer PARITY_BUF may be configured to store only a parity for data without storing the data.

When the memory controller 120 stores a parity for data in a separate parity buffer PARITY_BUF in this way, the memory controller 120 may write all sub-data to the first super memory block SBLK_1 before completing the parity calculation for the data. Therefore, while calculating the parity as described with reference to FIG. 6, a problem caused when the memory controller 120 does not complete the operation of writing data to the memory device 110 does not occur.

Moreover, when the parity for the data is stored in a separate parity buffer (PARITY_BUF) as described above, one or more parities stored in the parity buffer PARITY_BUF should be stored in the memory device 110 again. This is because it is necessary for a parity to be stored in the memory device 110 to ensure that the parity is not to lost even when the power supplied to the memory system 100 is interrupted.

Accordingly, when a predetermined condition is satisfied, the memory controller 120 may write all or some of one or more parities stored in the parity buffer PARITY_BUF to the memory device 110. Furthermore, among the one or more parities stored in the parity buffer PARITY_BUF, the parities written in the memory device 110 are deleted from the parity buffer PARITY_BUF.

Figure 8:
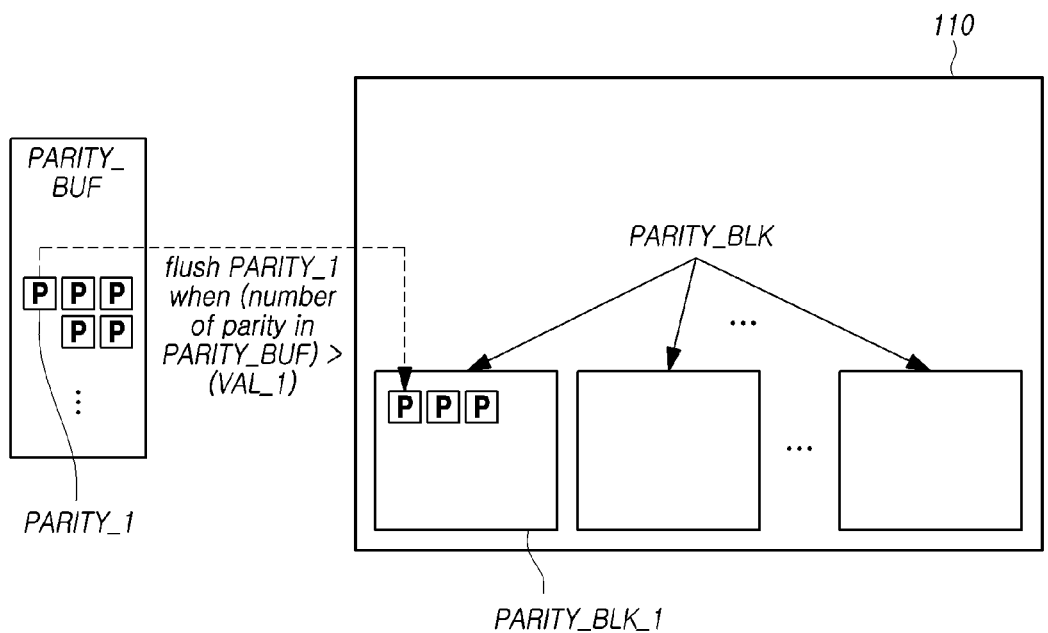
FIG. 8 is a diagram illustrating an operation in which the memory system writes the first parity stored in the parity buffer of FIG. 7 to the memory device according to various embodiments of the present disclosure.

FIG. 8 is a diagram illustrating an operation in which the memory system 100 according to various embodiments of the present disclosure writes the first parity PARITY_1 stored in the parity buffer PARITY_BUF of FIG. 7 to the memory device 110.

Referring to FIG. 8, the memory controller 120 included in the memory system 100 may write the first parity PARITY_1 stored in the parity buffer PARITY_BUF to the first parity block PARITY_BLK_1 among a plurality of parity blocks PARITY_BLK among the plurality of memory blocks BLK. The parity block PARITY_BLK is a memory block configured to store a parity.

The memory controller 120 may independently write the first parity PARITY_1 to the first parity block PARITY_BLK_1 or may simultaneously store all the parities (including the first parity PARITY_1), stored in the parity buffer PARITY_BUF, to the first parity block PARITY_BLK_1.

When a predetermined condition is satisfied, the memory controller 120 may write the first parity PARITY_1 to the first parity block PARITY_BLK_1.

For example, when the number of parities stored in the parity buffer PARITY_BUF is equal to or greater than a first predetermined value (VAL_1) (e.g., 32/64), the memory controller 120 may write the first parity PARITY_1 to the first parity block PARITY_BLK_1.

When the number of parities stored in the parity buffer PARITY_BUF is equal to or greater than the first predetermined value (VAL_1), the memory controller 120 may write the first parity PARITY_1 to the first parity block PARITY_BLK_1 to secure a spare space in the parity buffer PARITY_BUF. In this case, the first value (VAL_1) may be determined in proportion to the size of the parity block PARITY_BLK.

As another example, the memory controller 120 may check whether there is a parity stored in the parity buffer PARITY_BUF every set period (e.g., 10 ms). In addition, when the first parity PARITY_1 is stored in the parity buffer PARITY_BUF, the memory controller 120 may write the first parity PARITY_1 to the first parity block PARITY_BLK_1.

Additionally, the plurality of parity blocks PARITY_BLK included in the memory device 110 may be set in various ways.

For example, each of the parity blocks PARITY_BLK may be set to one or more memory blocks BLK included in the memory device 110.

As another example, each of the plurality of parity blocks PARITY_BLK may be one of the plurality of super memory blocks SBLK described above with reference to FIGS. 5 to 7. Hereinafter, a case in which each parity block PARITY_BLK is one of the plurality of super memory blocks SBLK will be described with reference to FIG. 9.

Figure 9:
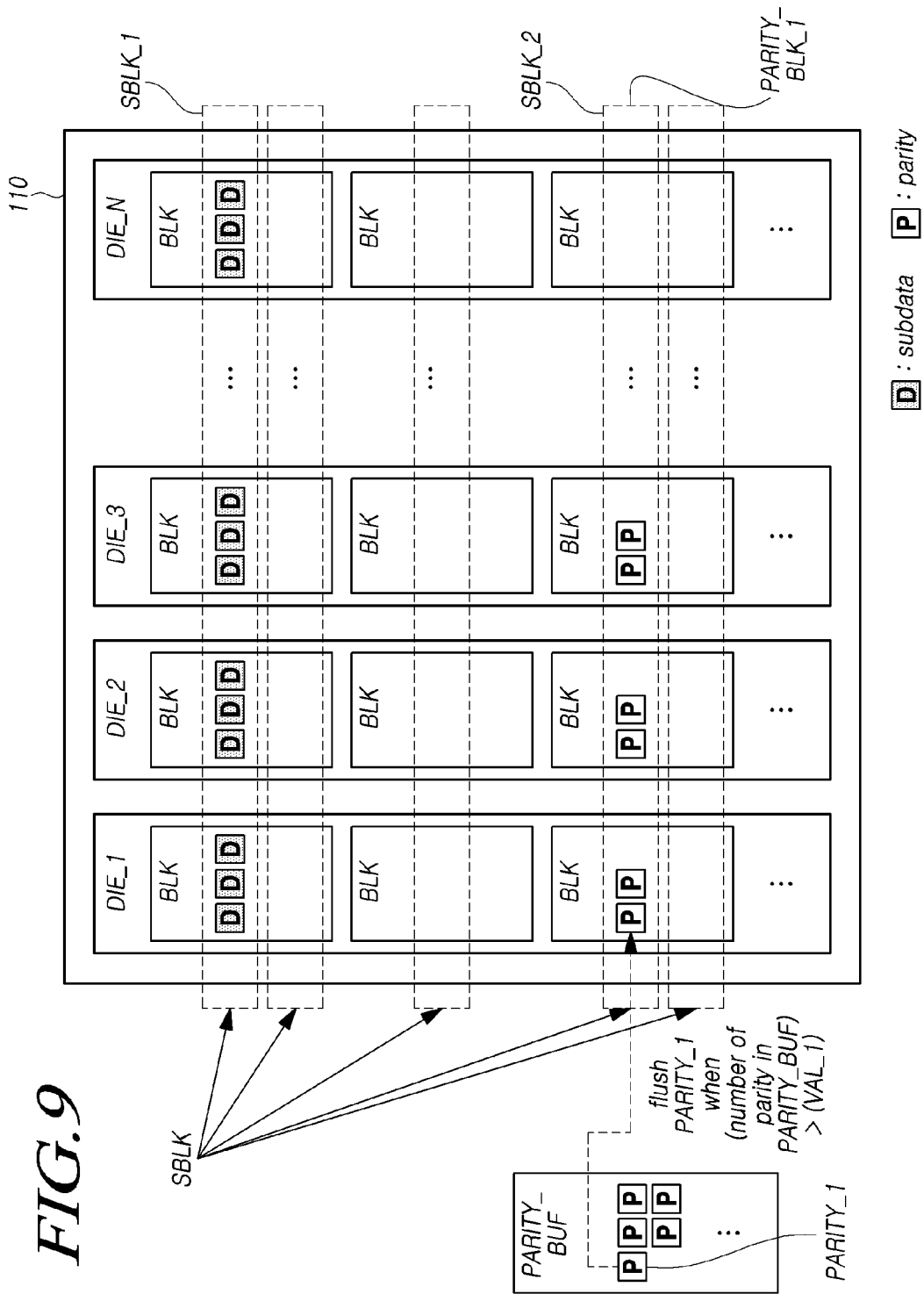
FIG. 9 is a diagram illustrating an operation in which the memory system writes the first parity stored in the parity buffer of FIG. 7 to one of super memory blocks according to various embodiments of the present disclosure.

FIG. 9 is a diagram illustrating an operation in which the memory system 100 according to embodiments writes the first parity PARITY_1 stored in the parity buffer PARITY_BUF of FIG. 7 to one of the super memory blocks.

Referring to FIG. 9, the memory controller 120 included in the memory system 100 may write the first parity PARITY_1 stored in the parity buffer PARITY_BUF to the first parity block PARITY_BLK_1 among a plurality of parity blocks PARITY_BLK included in the memory device 110.

In this case, the first parity block PARITY_BLK_1 may be a second super memory block SBLK_2 that differs from a first super memory block SBLK_1 in which data is stored among the plurality of super memory blocks SBLK.

As described above with reference to FIGS. 7 to 9, when data and parities are stored in separate areas, a data structure for managing mapping information between data and a parity for the data is additionally required. This is because the memory controller 120 needs to know where the parities for data are located in the plurality of parity blocks PARITY_BLK.

Accordingly, the memory controller 120 may set a parity map for managing mapping information between data and a parity for the data. Hereinafter, a parity map will be described in detail with reference to FIG. 10.

Figure 10:
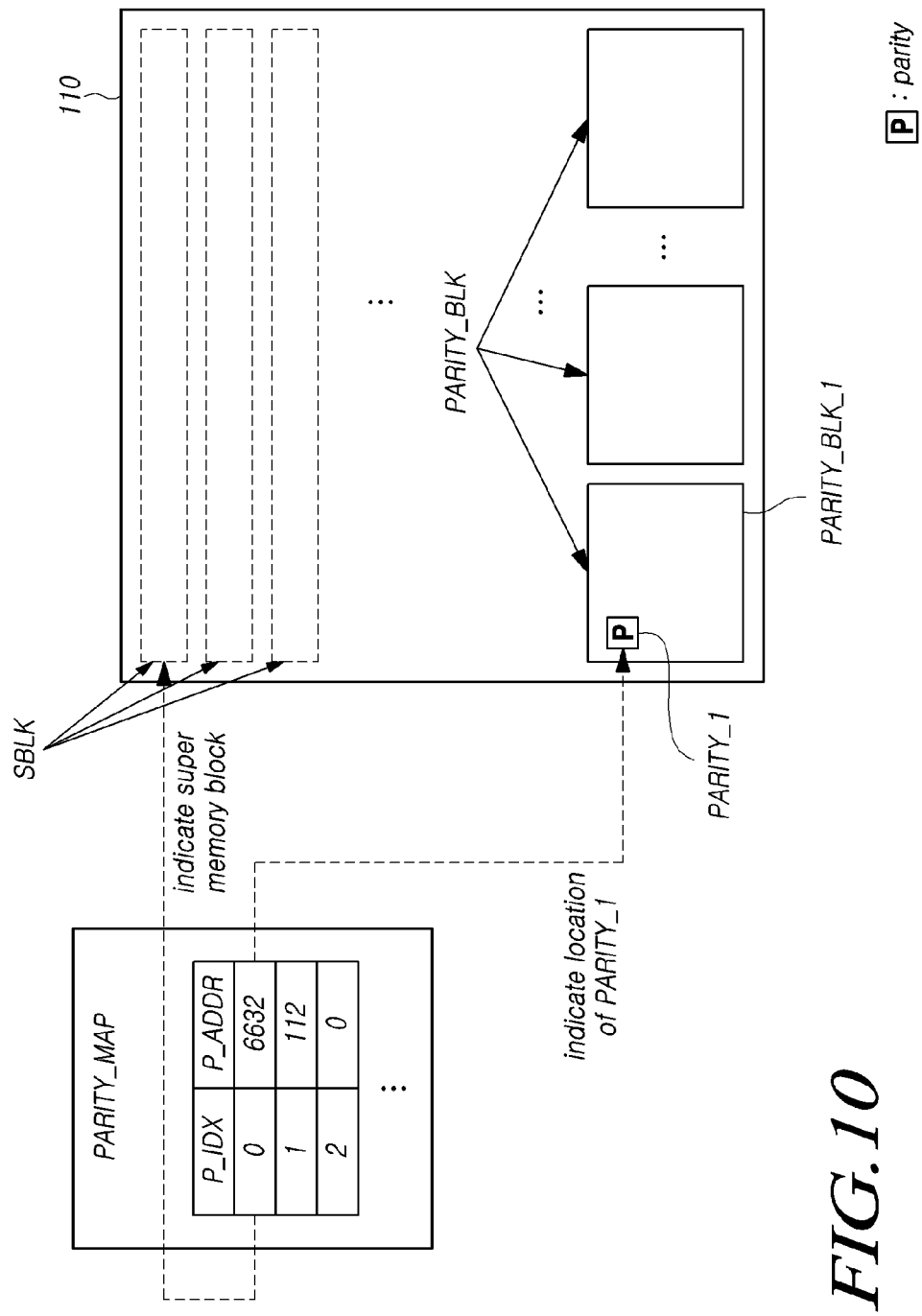
FIG. 10 is a diagram illustrating a parity map set in the memory system according to various embodiments of the present disclosure.

FIG. 10 is a diagram illustrating a parity map PARITY_MAP set in a memory system 100 according to various embodiments of the present disclosure.

Referring to FIG. 10, a memory controller 120 included in the memory system 100 may set a parity map PARITY_MAP including a set of parity map entries. In this case, each of the parity map entries included in the set of parity map entries may indicate a location of the parity within the parity block PARITY_BLK and a location of corresponding data within the super memory blocks SBLK.

For example, each parity map entry may include an index field P_IDX indicating a super memory block in which data is stored and an address field P_ADDR indicating a location of a parity for the data.

The memory controller 120 may write the first parity PARITY_1, which is a parity for data stored in the first super memory block SBLK_1, to a parity block PARITY_BLK and may then update a parity map entry corresponding to the first parity PARITY_1 in the parity map PARITY_MAP.

That is, the memory controller 120 may update, for one of the parity map entries included in the parity map PARITY_MAP, the corresponding parity map entry such that the index field P_IDX of the corresponding parity map entry indicates the first super memory block SBLK_1 and the address field P_ADDR of the corresponding parity map entry indicates the address at which the first parity PARITY_1 is stored, which is a parity for data stored in the first super memory block SBLK_1.

Moreover, when the memory controller 120 repeats the process of updating the parity map entry included in the parity map PARITY_MAP as described above, a parity corresponding to the parity map entry may turn from a valid parity into an invalid parity. In this case, the wording "a parity is valid" means that data corresponding to the parity is valid, that is, it is possible for the host (HOST) to access the corresponding data. In contrast, the wording "a parity is invalid" means that data corresponding to the parity is invalid, that is, the host (HOST) cannot access the corresponding data.

For example, one of the parity map entries included in the parity map PARITY_MAP indicates a location at which a parity for data stored in the first super memory block SBLK_1 among the plurality of super memory blocks SBLK, is stored.

If the data stored in the first super memory block SBLK_1 is changed, the memory controller 120 may write the changed data to another super memory block other than the first super memory block SBLK_1 among the plurality of super memory blocks SBLK.

Then, the memory controller 120 may newly calculate the parity for the changed data and may store the newly calculated parity in the parity buffer PARITY_BUF.

In this case, the data stored in the first super memory block SBLK_1 is no longer valid, and the parity for the data stored in the first super memory block SBLK_1 is also not valid.

Accordingly, the memory controller 120 should record information indicating that the parity for the data stored in the first super memory block SBLK_1 among the parities stored in the parity block PARITY_BLK is not valid.

Therefore, the memory controller 120 needs to set a valid parity table PARITY_VPT, which is a data structure indicating whether a parity is valid. Hereinafter, a valid parity table PARITY_VPT will be described in detail with reference to FIG. 11.

Figure 11:
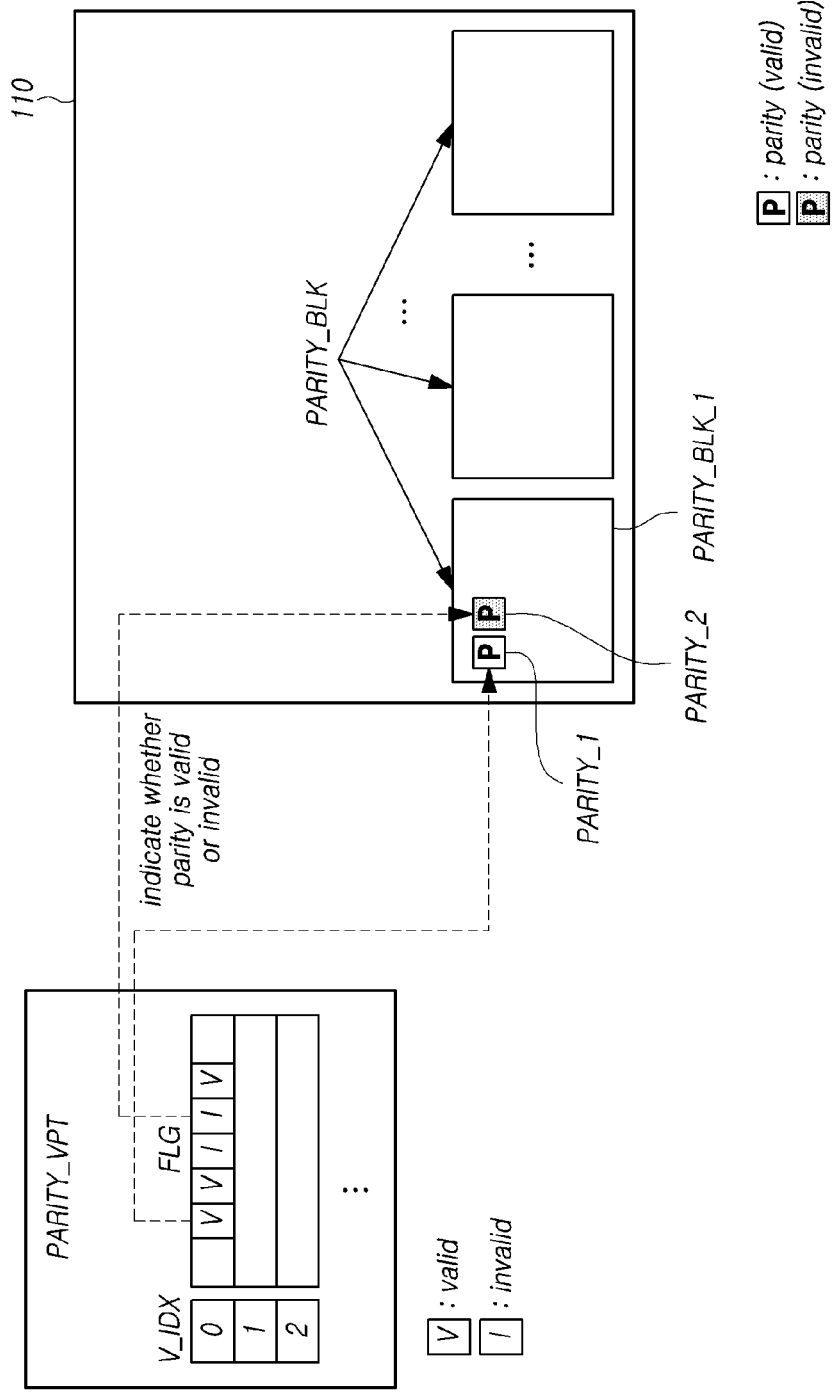
FIG. 11 is a diagram illustrating a valid parity table set in the memory system according to various embodiments of the present disclosure.

FIG. 11 is a diagram illustrating a valid parity map PARITY_VPT set in the memory system 100 according to embodiments.

The valid parity table PARITY_VPT may indicate whether a parity of each parity map entry included in the parity map PARITY MAP of FIG. 10 is valid.

The valid parity table PARITY_VPT may include one or more parity table entries. Each parity table entry may include index information V_IDX and a set of flags FLG indicating whether a parity corresponding to one parity map entry is valid.

In this case, the flag FLG may be expressed by one bit information, and the set of flags FLG may be expressed by a bitmap.

For example, each parity table entry included in the valid parity table PARITY_VPT may include a set including 32 flags FLG, and the 32 flags FLG may be represented by numeric values of 4 bytes (e.g., 0xFFFFFFFF, 0xFFF20FFF, 0x090FFFFF). The memory controller 120 may specify a parity corresponding to a flag FLG, based on the index information V_IDX of the valid parity table entry PARITY_VPT and the locations of flags FLG in the set of the flags FLG.

In FIG. 11, one of the flags FLG included in the parity table entry in which the index information V_IDX of the parity table entry is 0 corresponds to the first parity PAR_1 and another one of the flags FLG corresponds to a second parity PARITY_2 that differs from the parity PARITY_1.

In FIG. 11, a flag FLG corresponding to the first parity PARITY_1 indicates that the first parity PARITY_1 stored in the first parity block PARITY_BLK_1 is valid. In addition, a flag FLG corresponding to the second parity PARITY_2 indicates that the second parity PARITY_2 stored in the first parity block PARITY_BLK_1 is invalid.

Furthermore, a location in the parity map PARITY_MAP described above with reference to FIG. 10 may be determined, based on a location in a data map indicating mapping information about data stored in the memory device 110 (that is, information indicating at which location in the memory device 110 data is stored).

For example, an address value indicating a location in the parity map PARITY_MAP may be continuous with an address value indicating a location in the data map. If the locations in the data map are 0x00000 to 0xFFFFF, the locations in the parity map PARITY_MAP may start from 0x10000.

Similarly, the locations in the valid parity table PARITY_VPT described above in FIG. 11 may be determined based on the locations in the valid data table indicating whether the data stored in the memory device 110 is valid.

For example, an address value indicating a location in the valid parity table PARITY_VPT may be continuous with an address value indicating a location in the valid data table If the locations in the valid data table are 0x20000 to 0x2FFFF, the locations in the valid parity table PARITY_VPT may start from 0x30000.

In the foregoing, an operation of storing data and parities in the memory device 110 and a data structure for managing data and parities have been described.

Hereinafter, a detailed operation of restoring data, based on the above-described data and parities when a failure occurs while reading data will be described.

Figure 12:
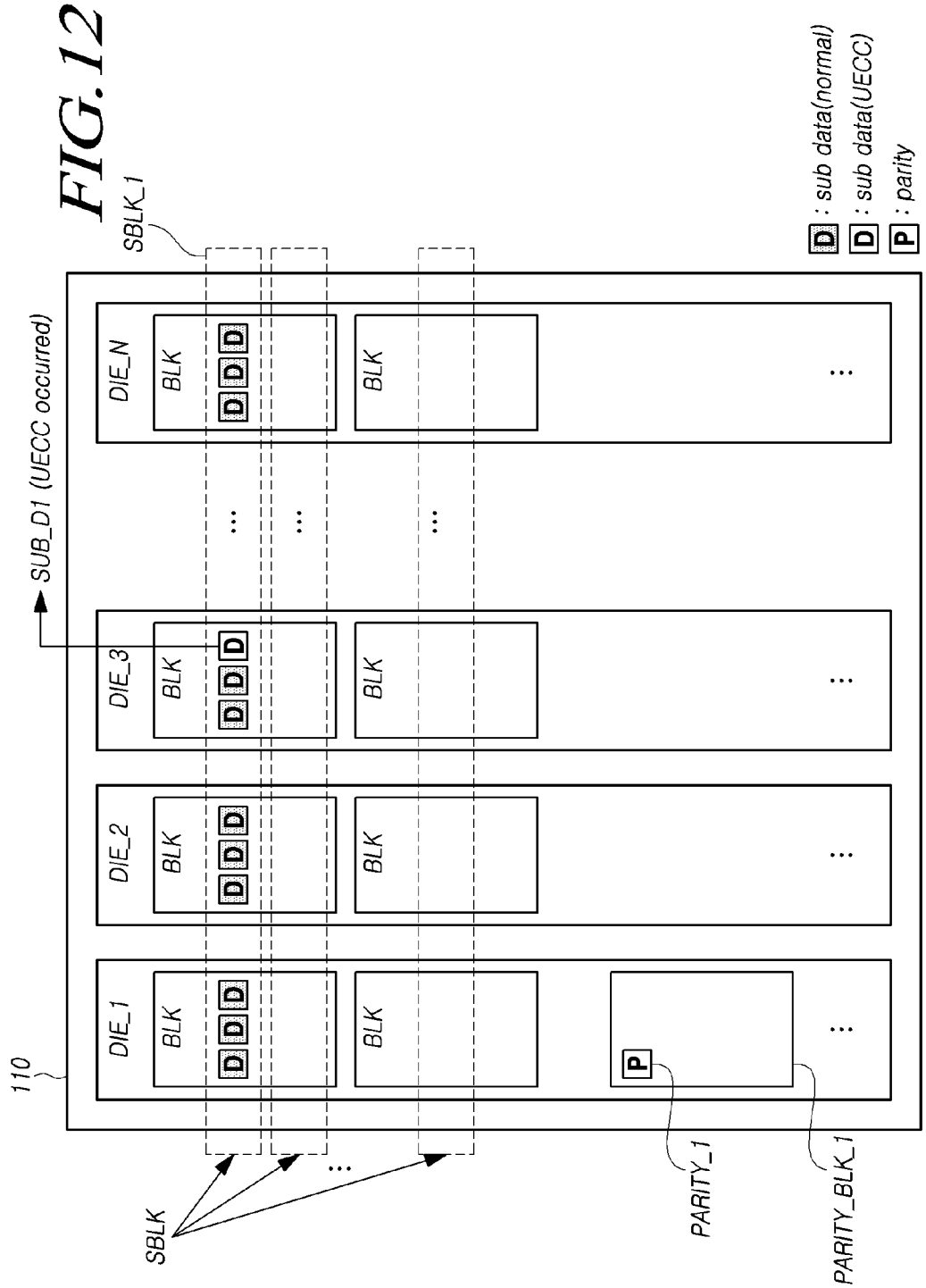
FIG. 12 is a diagram illustrating an uncorrectable ECC (UECC) which occurs in one sub-data in data stored in a super memory block SBLK in the memory system 100 according to various embodiments of the present disclosure.

FIG. 12 is a diagram illustrating a case in which an uncorrectable ECC (UECC) occurs in one sub-data in data stored in a super memory block SBLK in the memory system 100 according to embodiment.

Referring to FIG. 12, a UECC occurs in a first sub-data (SUB_D1) stored in a memory block BLK included in a memory die DIE_3 among data stored in a first super memory block SBLK_1 among a plurality of super memory blocks SBLK.

In addition, a parity for data stored in the first super memory block SBLK_1 is stored in the first parity block PARITY_BLK_1. In FIG. 12, even though the first parity block PARITY_BLK_1 is included in the memory die DIE_1, the location of the first parity block PARITY_BLK_1 is not limited to a specific memory die. For example, as described with reference to FIG. 9, the first parity block PARITY_BLK_1 may be one of the plurality of super memory blocks SBLK.

Figure 13:
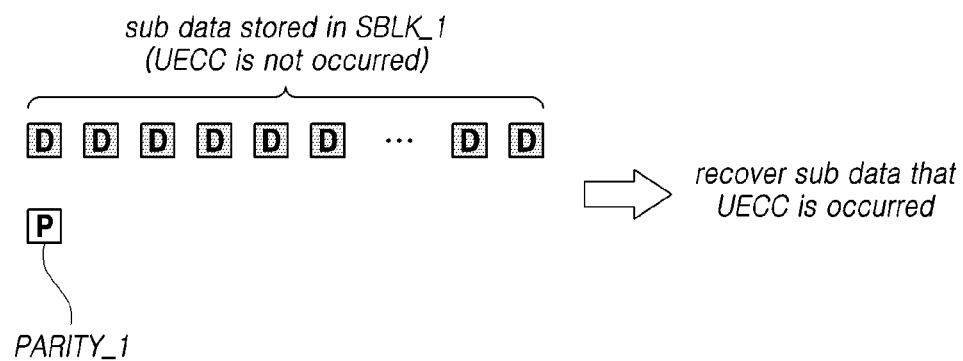
FIG. 13 is a diagram illustrating an operation in which the memory system restores first sub-data in which a UECC occurs in FIG. 12 according to various embodiments of the present disclosure.

FIG. 13 is a diagram illustrating an operation in which the memory system 100 according to embodiments restores first sub-data SUB_D1 in which a UECC occurs in FIG. 12.

Referring to FIG. 13, based on the first parity PARITY_1 stored in the first parity block PARITY_BLK_1 remaining sub-data except for the first sub-data SUB_D1 in which a UECC occurs among data stored in the first super memory block, the memory controller 120 included in the memory system 100 may restore the first sub-data SUB_D1 in which the UECC occurs.

FIG. 14 is a diagram illustrating a logic in which the memory system 100 according to various embodiments restores first sub-data SUB_D1 in which a UECC occurs.

As an example in FIG. 14, 12-bit data are stored in the first super memory block SBLK_1, and 12-bit data are stored in the state of being divided into three sub-data SUB_D1, SUB_D2, and SUB_D3 having a size of 4 bits.

Among the three sub-data SUB_D1, SUB_D2, and SUB_D3, the first sub-data SUB_D1 is 0b1010, the second sub-data SUB_D2 is 0b1101, and the third sub-data SUB_D3 is 0b0100.

In this case, the parity for 12-bit data stored in the first super memory block SBLK_1 is calculated as ((0b1010) XOR (0b1101) XOR (0b0100))=0b0011.

Specifically, the first bit of the parity is calculated as 0, which is a value obtained by performing an XOR operation on 1, which is the first bit of the first sub-data SUB_D1, 1, which is the first bit of the second sub-data SUB_D2, and 0, which is the first bit of the third sub-data SUB_D3 ((1 XOR 1 XOR 0)=0).

The second bit of the parity is calculated as 0, which is a value obtained by performing an XOR operation on 0, which is the second bit of the first sub-data SUB_D1, 1, which is the second bit of the second sub-data SUB_D2, and 1, which is the second bit of the third sub-data SUB_D3 ((0 XOR 1 XOR 1)=0).

The third bit of the parity is calculated as 1, which is a value obtained by performing an XOR operation on 1, which is the third bit of the first sub-data SUB_D1, 1, which is the third bit of the second sub-data SUB_D2, and 0, which is the first bit of the third sub-data SUB_D3 ((1 XOR 1 XOR 0)=1).

The fourth bit of the parity is calculated as 0, which is a value obtained by performing an XOR operation on 0, which is the fourth bit of the first sub-data SUB_D2, 1, which is the fourth bit of the second sub-data SUB_D1, and 0, which is the fourth bit of the third sub-data SUB_D3 ((0 XOR 1 XOR 0)=1).

When a UECC occurs in the first sub-data SUB_D1, the memory controller 120 of the memory system 100 may determine the value obtained by performing an XOR on remaining two sub-data SUB_D2 and SUB_D3 except for the first sub-data SUB_D1 among the three sub-data SUB_D1, SUB_D2, and SUB_D3, and the parity ((0b1101) XOR (ob0100) XOR (0b0011))=(0b1010) as the value of the normal first sub-data SUB_D1 (that is, the value of the first sub-data SUB_D1 before the UECC occurs).

Specifically, the memory controller 120 may determine the value of the first bit of the normal first sub-data SUB_D1 as 1, which is a value obtained by performing an XOR on 1, which is the first bit of the second sub-data SUB_D2, 0, which is the first bit of the third sub-data, and 0 which is the first bit of the parity ((1 XOR 0 XOR 0)=1).

The memory controller 120 may determine the value of the second bit of the normal first sub-data SUB_D1 as 0, which is a value obtained by performing an XOR on 1, which is the second bit of the second sub-data SUB_D2, 1, which is the second bit of the third sub-data, and 0, which is the second bit of the parity ((1 XOR 1 XOR 0)=0).

The memory controller 120 may determine the value of the third bit of the normal first sub-data SUB_D1 as 1, which is a value obtained by performing an XOR on 0, which is the third bit of the second sub-data SUB_D2, 0 which is the third bit of the third sub-data, and 1, which is the third bit of the parity ((0 XOR 0 XOR 1)=1).

The memory controller 120 may determine the value of the fourth bit of the normal first sub-data SUB_D1 as 0, which is a value obtained by performing an XOR on 1, which is the fourth bit of the second sub-data SUB_D2, 0, which is the fourth bit of the third sub-data, and 1, which is the fourth bit of the parity ((1 XOR 0 XOR 1)=0).

In the forgoing, a specific operation of restoring data based on data and parity has been described.

Hereinafter, a detailed operation of managing parity blocks PARITY_BLK in which parities are stored will be described.

Figure 15:
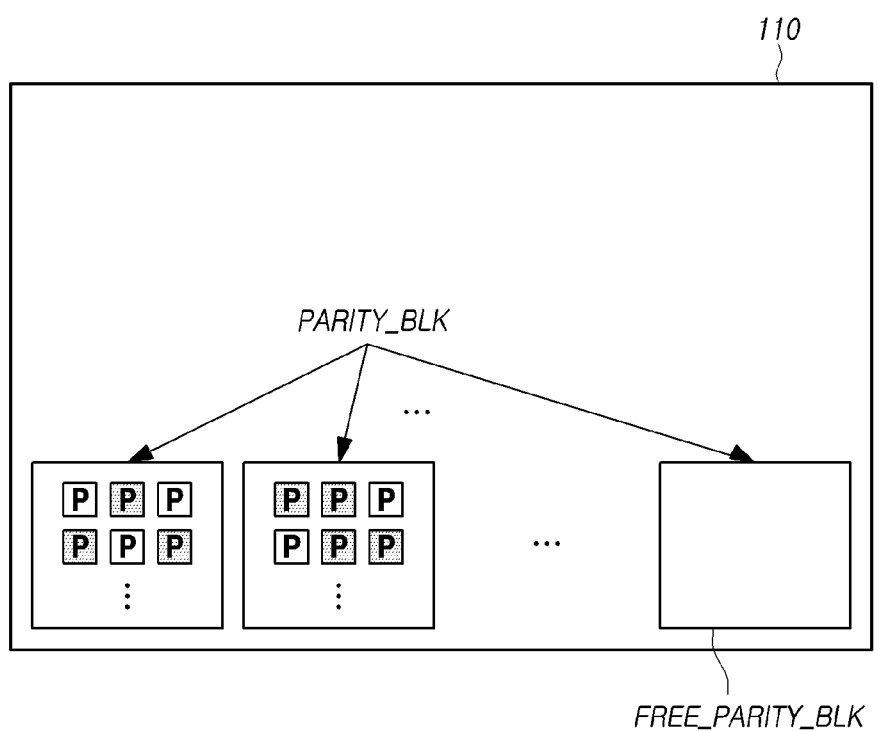
FIG. 15 is a diagram illustrating the state of a parity block in the memory system according to various embodiments of the present disclosure.

FIG. 15 is a diagram illustrating the state of a parity map PARITY_MAP set in the memory system 100 according to various embodiments of the present disclosure.

Referring to FIG. 15, at least some of a plurality of parity blocks PARITY_BLK may be free parity blocks FREE_PARITY_BLK. The free parity block FREE_PARITY_BLK refers to a parity block in a state in which data has been erased and is a parity block that does not store a valid parity and an invalid parity.

Furthermore, if the data stored in the memory device 110 is continuously updated, the parities for the updated data are also newly generated. Accordingly, the sum of the number of valid parities and invalid parities stored in the parity block PARITY_BLK continuously increases.

In addition, the number of free parity blocks FREE_PARITY_BLK is reduced among the parity blocks PARITY_BLK. This is because, when a newly generated parity is not able to be stored in a parity block other than the free parity blocks FREE_PARITY_BLK, the newly generated parity is stored in one of the free parity blocks FREE_PARITY_BLK.

When the number of free parity blocks FREE_PARITY_BLK continuously decreases and thus no free parity block FREE_PARITY_BLK exists among the parity blocks PARITY_BLK, even if the data stored in the memory device 110 is updated thereafter, a problem may occur in that the memory controller 120 is not able to store a parity for data to be updated in the memory device 110.

Accordingly, when the number of free parity blocks FREE_PARITY_BLK is less than or equal to a second set value, the memory controller 120 may designate at least one victim parity block among the parity blocks PARITY_BLK and may migrate a valid parity among the parities stored in the victim parity block to a target parity block. In addition, the memory controller 120 may erase the victim parity block to make a free parity block FREE_PARITY_BLK. Through this process, the memory controller 120 may secure the number of free parity blocks FREE_PARITY_BLK among the parity blocks PARITY_BLK by a predetermined value or more.

Figure 16:
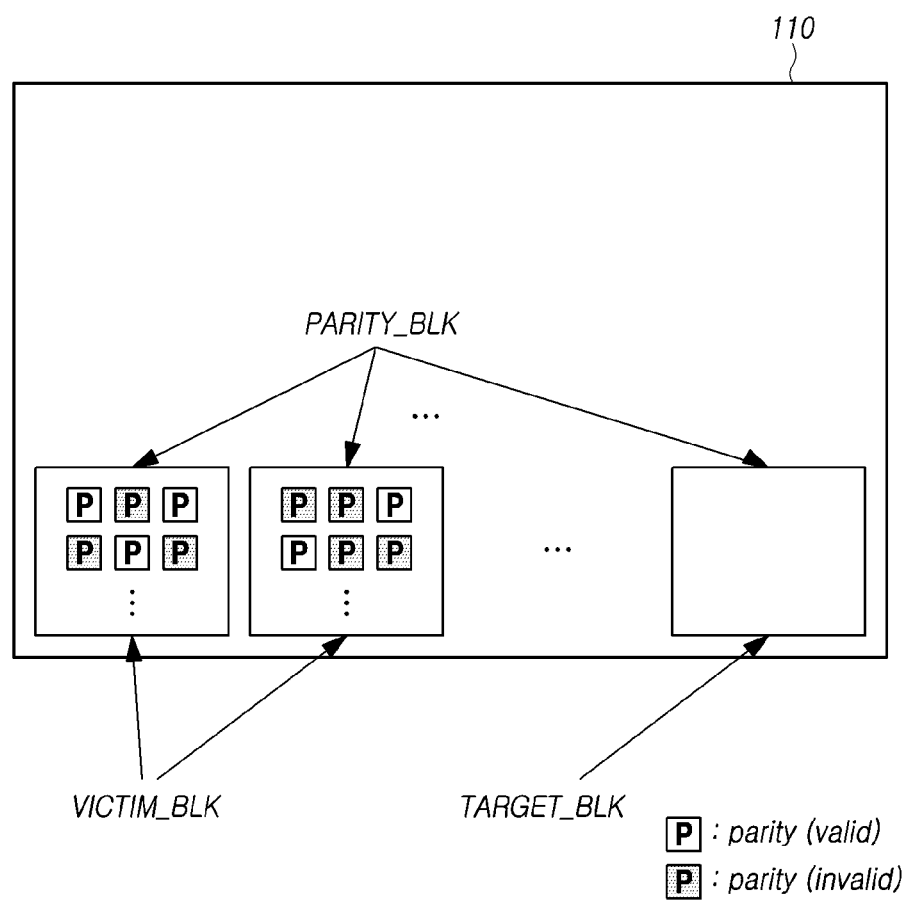
FIG. 16 is a diagram illustrating an operation in which the memory system selects a victim parity block and a target parity block according to various embodiments of the present disclosure.

FIG. 16 is a diagram illustrating an operation in which the memory system 100 selects a victim parity block VICTIM_BLK and a target parity block TARGET_BLK among the parity blocks PARITY_BLK according to various embodiments of the present disclosure.

The victim parity block VICTIM_BLK may be a parity block that stores one or more valid parities, or one or more invalid parities.

In this case, the target parity block TARGET_BLK may be a free parity block FREE_PARITY_BLK described with reference to FIG. 15.

Furthermore, there may be various methods in which the memory system 100 selects a victim parity block VICTIM_BLK from parity blocks PARITY_BLK.

For example, the memory controller 120 included in the memory system 100 may randomly select a victim parity block VICTIM_BLK from parity blocks other than a free parity block FREE_PARITY_BLK among the plurality of parity blocks PARITY_BLK.

As another example, the memory controller 120 may select a victim parity block VICTIM_BLK, based on the number of invalid parities among parities stored in each of the plurality of parity blocks. Hereinafter, this will be described in detail with reference to FIG. 17.

Figure 17:
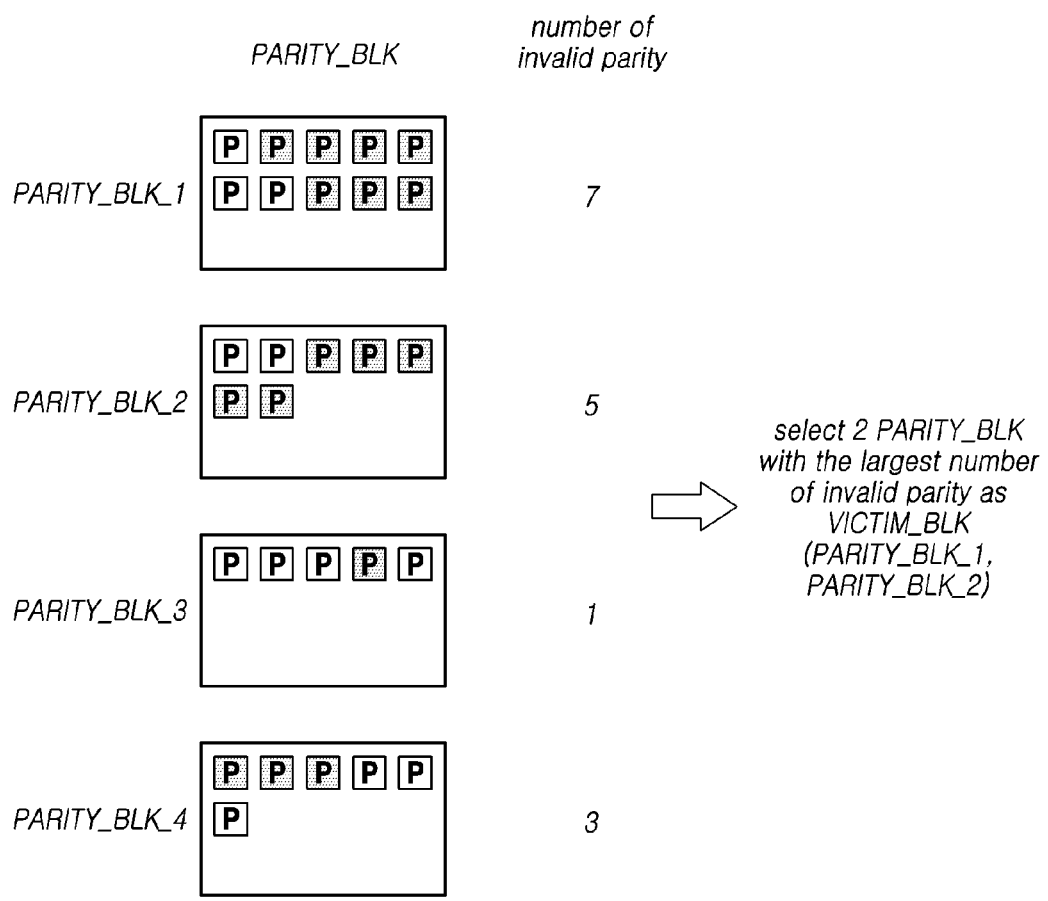
FIG. 17 is a diagram illustrating an example in which a victim parity block is selected among a plurality of parity blocks in the memory system according to various embodiments of the present disclosure.

FIG. 17 is a diagram illustrating an example in which a victim parity block VICTIM_BLK is selected among a plurality of parity blocks PARITY_BLK in the memory system 100 according to various embodiments of the present disclosure.

In FIG. 17, four parity blocks PARITY_BLK_1, PARITY_BLK_2, PARITY_BLK_3, and PARITY_BLK_4 exist in the memory device 110.

Referring to FIG. 17, the parity block PARITY_BLK_1 stores three valid parities and seven invalid parities. The parity block PARITY_BLK_2 stores two valid parities and five invalid parities. The parity block PARITY_BLK_3 stores four valid parities and one invalid parity. Finally, the parity block PARITY_BLK_4 stores three valid parities and three invalid parities.

Among the four parity blocks PARITY_BLK_1, PARITY_BLK_2, PARITY_BLK_3, and PARITY_BLK_4, the memory controller 120 may select N parity blocks (N is a natural number) having the largest number of invalid parities as victim parity blocks VICTIM_BLK.

If N=2, the memory controller 120 may select two parity blocks PARITY_BLK_1 and PARITY_BLK_2 having the largest number of invalid parities as victim parity blocks VICTIM_BLK.

The reason why the memory controller 120 selects the N parity blocks having the largest number of invalid parities among the plurality of parity blocks PARITY_BLK as the victim parity blocks VICTIM_BLK is to secure more free space for storing newly generated parities by erasing as many as possible invalid parities when the memory controller 120 erases victim blocks VICTIM_BLK thereafter.

Figure 18:
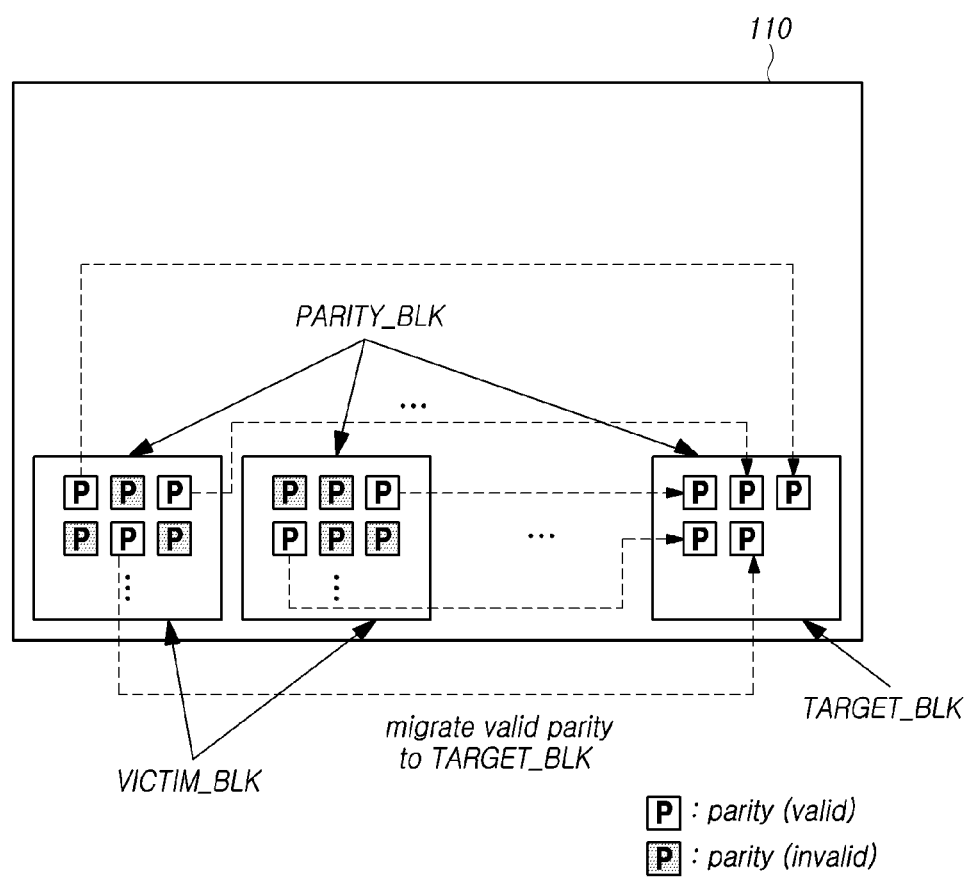
FIG. 18 is a diagram illustrating an operation of migrating a parity stored in a victim parity block to a target parity block in the memory system according to various embodiments of the present disclosure.

FIG. 18 is a diagram illustrating an operation of migrating a parity stored in a victim parity block VICTIM_BLK to a target parity block TARGET_BLK in the memory system 100 according to various embodiments of the present disclosure.

The memory controller 120 included in the memory system 100 may migrate a valid parity among parities stored in a victim parity block VICTIM_BLK to a target parity block TARGET_BLK before erasing the victim parity block VICTIM_BLK. This is because a valid parity among the parities stored in the victim parity block VICTIM_BLK should be continuously stored in the memory device 110 even if the victim parity block VICTIM_BLK is erased.

Moreover, when the memory controller 120 migrates a valid parity among parities stored in a victim parity block VICTIM_BLK to a target parity block TARGET_BLK as described above, the memory controller 120 may update a parity map entry corresponding to the parity migrated from the parity map, and may update information on the parity migrated from the valid parity map.

Figure 19:
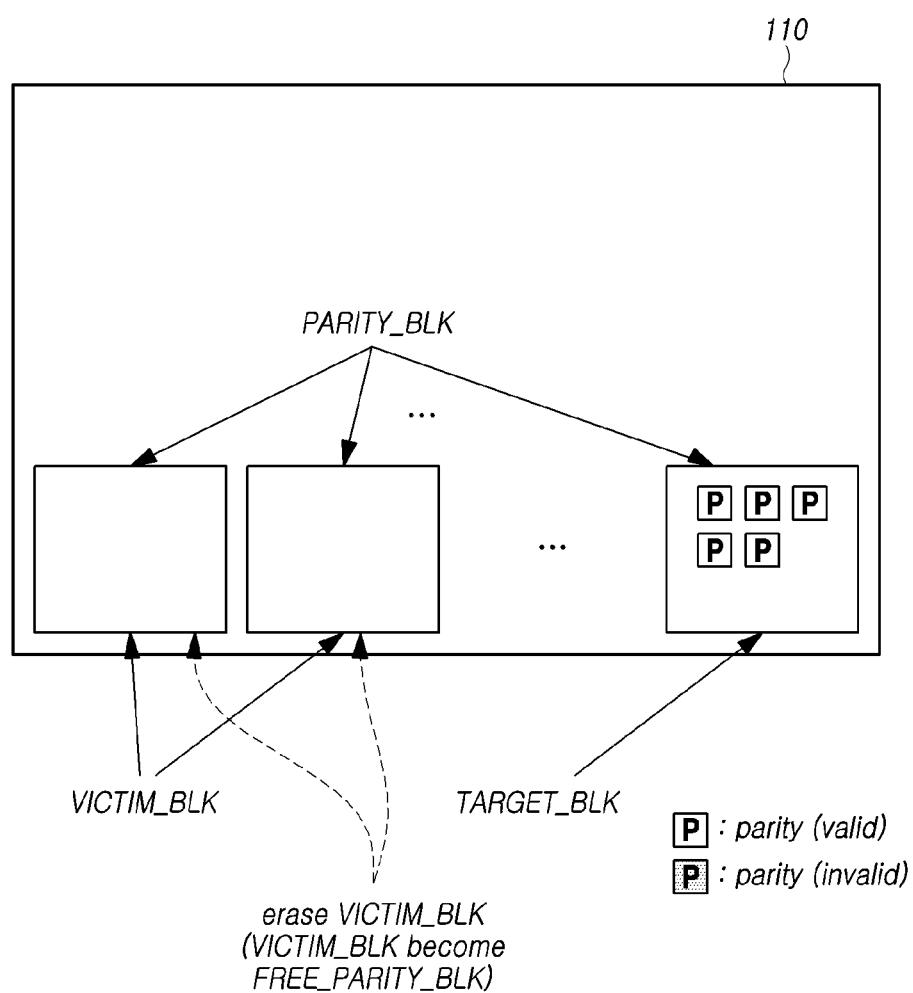
FIG. 19 is a diagram illustrating an operation in which a victim parity block is erased in the memory system according to various embodiments of the present disclosure.

FIG. 19 is a diagram illustrating an operation of erasing a victim parity block VICTIM_BLK from the memory system 100 according to embodiments.

The memory controller 120 included in the memory system 100 may erase the victim parity block VICTIM_BLK after migrating all valid parities among the parities stored in the victim parity block VICTIM_BLK to the target parity block TARGET_BLK. When the victim parity block VICTIM_BLK is erased, the erased parity block VICTIM_BLK becomes a free parity block FREE_PARITY_BLK.

In this way, the memory controller 120 may repeat the operation of erasing invalid parities from the parity blocks PARITY_BLK and the operation of collecting valid parities to efficiently manage parities for data stored in each of a plurality of super memory blocks SBLK.

Figure 20:
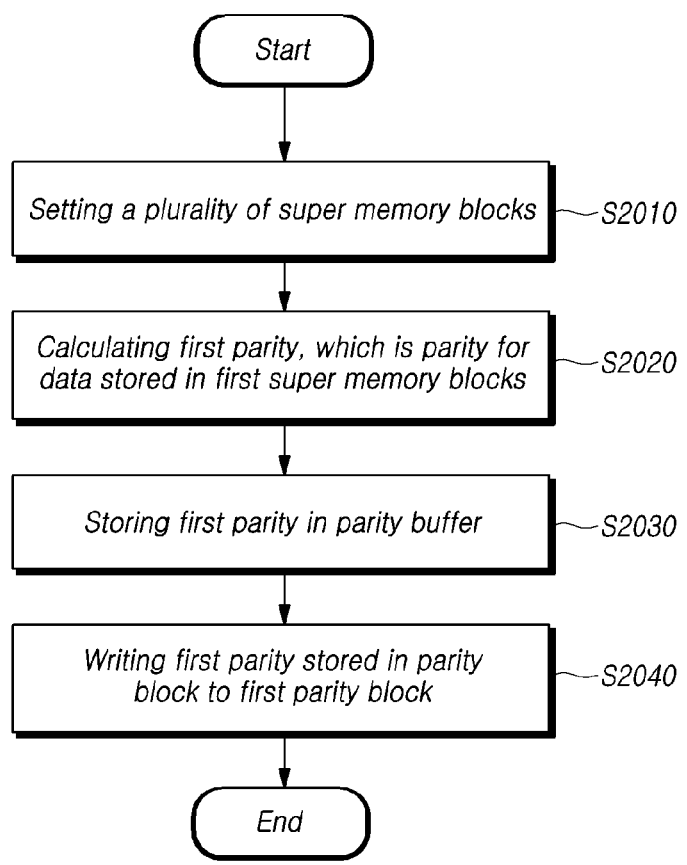
FIG. 20 is a flowchart illustrating a method of operating the memory controller according to various embodiments of the present disclosure.

FIG. 20 is a flowchart illustrating a method of operating the memory controller 120 according to various embodiments of the present disclosure.

The method of operating the memory controller 120 may include a step of setting a plurality of super memory blocks (S2010).

The method of operating the memory controller 120 may include a step of calculating a first parity, which is a parity for data stored as a plurality of sub-data in a first super memory block, with respect to a first super memory block, which is one of the plurality of super memory blocks set in step S2010 (S2020). In this case, the size of the sub-data and the size of the first parity are the same.

The method of operating the memory controller 120 may include a step of storing the first parity calculated in step S2020 in a parity buffer configured to store one or more parities (S2030).

The method of operating the memory controller 120 may include a step of writing the first parity stored in the parity buffer to a first parity block among a plurality of parity blocks configured to store parities among a plurality of memory blocks when the number of parities stored in the parity buffer is equal to or greater than a first set value (S2040).

The operations of the memory controller 120 described above may be controlled by the control circuit 123 and may be performed in a manner in which the processor 124 executes (drives) firmware in which the overall operations of the memory controller 120 are programmed.

Figure 21:
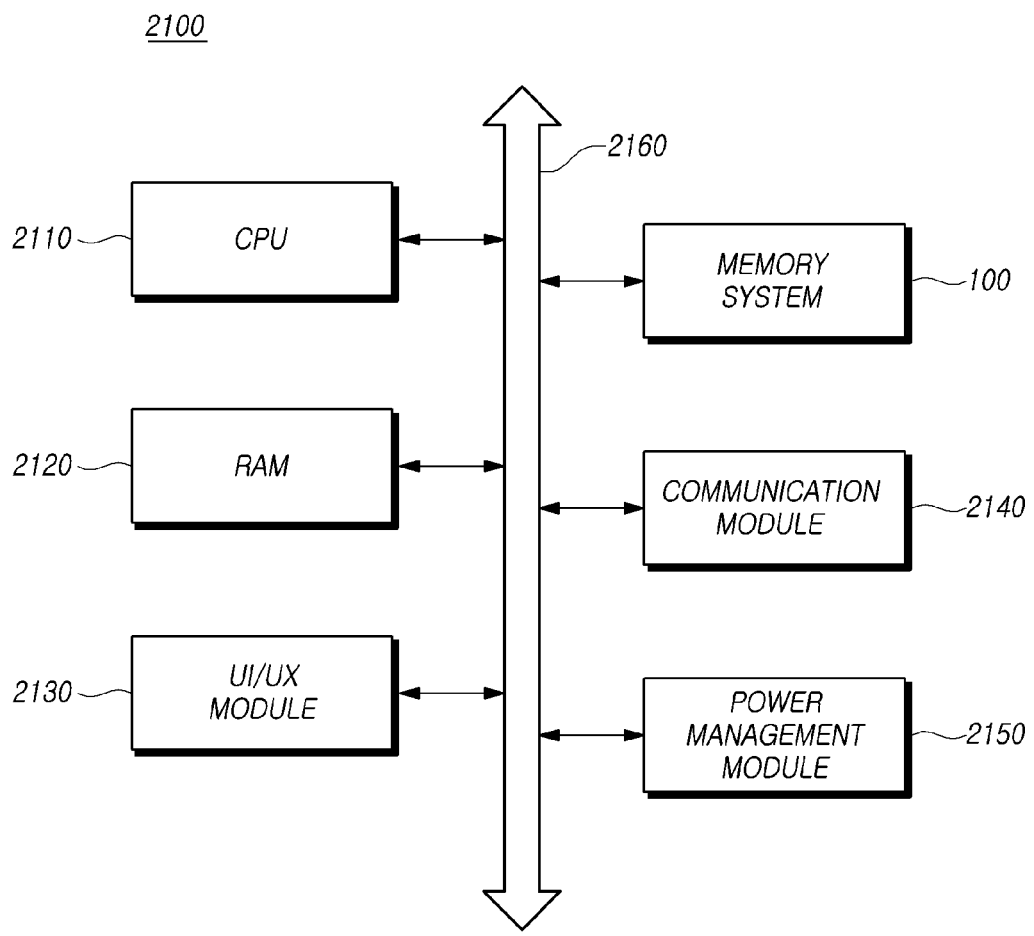
FIG. 21 is diagram schematically illustrating the configuration of a computing system according to embodiments of the present disclosure.

FIG. 21 is diagram illustrating the configuration of a computing system 2100 according to various embodiments of the present disclosure.

Referring to FIG. 21, the computing system 2100 according to embodiments may include, for example, a memory system 100 electrically connected to a system bus 2160, and a central processing unit (CPU) 210 configured to control the operations of the computing system 2100, RAM 2120 configured to store data and information associated with the operations of the computing system 2100, and a user interface/user experience (UI/UX) module 2130 configured to provide a user environment to a user, a communication module 2140 configured to communicate with an external device in a wired and/or wireless manner, and a power management module 2150 for managing power used by the computing system 2100.

The computing system 2100 may be a personal computer (PC) or may include a mobile terminal, such as a smart phone or a tablet, or various electronic devices.

The computing system 2100 may further include a battery for supplying an operating voltage, and may further include, for example, an application chipset, a graphics-related module, a camera image processor (CIS), and DRAM. Other features will be apparent to those who have acquired common knowledge in this field.

The memory system 100 may include not only a device for storing data in a magnetic disc, such as a hard disk drive (HDD), but also a device for storing data in a nonvolatile memory, such as a solid state drive (SSD), a universal flash storage (UFS) device, or an embedded MMC (eMMC). The nonvolatile memory may include, for example, read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), or ferroelectric RAM (FRAM). In addition, the memory system 100 may be implemented as various types of storage devices and may be mounted in various electronic devices.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A memory system comprising:
   a plurality of memory dies each including at least one of a plurality of memory blocks; and
   a memory controller configured to:
   set a plurality of super memory blocks from the plurality of memory blocks;
   calculate, for data stored as a plurality of sub-data in a selected first super memory block of the plurality of super memory blocks, a first parity having a size equal to a size of one of the plurality of sub-data corresponding to the first parity;
   store the first parity in a parity buffer configured to store one or more parities; and
   write, when a number of parities stored in the parity buffer is equal to or greater than a first set value, the first parity stored in the parity buffer to a first parity block among a plurality of parity blocks configured to store the parities.

2. The memory system of claim 1, wherein a value of an I-th bit, where I is a natural number, of the first parity is a value obtained by performing an XOR operation on respective I-th bit values of the plurality of sub-data.

3. The memory system of claim 1,
   wherein each of the plurality of parity blocks is one of the plurality of super memory blocks, and
   wherein the first parity block is a second super memory block that is different from the selected first super memory block among the plurality of super memory blocks.

4. The memory system of claim 1, wherein the memory controller is further configured to:
   set a parity map comprising a set of parity map entries each indicating locations of the parities within the parity blocks and corresponding data within the super memory blocks; and
   update a parity map entry corresponding to the first parity among the set of parity map entries after writing the first parity to the first parity block.

5. The memory system of claim 4, wherein the memory controller is further configured to:
   set a valid parity table comprising flag information indicating whether a parity corresponding to each parity map entry included in the parity map is valid; and
   update the flag information corresponding to the first parity in the valid parity table.

6. The memory system of claim 1, wherein the memory controller is further configured to restore, when an uncorrectable ECC (UECC) occurs in a first sub-data among the plurality of sub-data, the first sub-data based on the first parity and remaining sub-data except for the first sub-data among the plurality of sub-data.

7. The memory system of claim 6, wherein the memory controller is configured to restore an I-th bit value, where I is a natural number, of the first sub-data by performing an XOR operation on the I-th bit value of the first parity and I-th bit values of the remaining sub-data except for the first sub-data among the plurality of sub-data.

8. The memory system of claim 1, wherein the memory controller is further configured to migrate, when a number of free parity blocks among the plurality of parity blocks is equal to or less than a second set value, a valid parity among parities stored in at least one victim parity block among the plurality of parity blocks to a target parity block of one of the plurality of parity blocks.

9. The memory system of claim 8, wherein the memory controller is configured to migrate the valid parity by selecting the at least one victim parity block, based on a number of invalid parities among the parities stored in each of the plurality of parity blocks.

10. The memory system of claim 9, wherein the memory controller is further configured to erase the at least one victim parity block after migrating the valid parity among the parities stored in the victim parity block to the target parity block.

11. A memory controller comprising:
    a control circuit configured to control a plurality of memory dies each including at least one of a plurality of memory blocks,
    wherein the control circuit is configured to:
    set a plurality of super memory blocks from the plurality of memory blocks;
    calculate, for data stored as a plurality of sub-data in a selected first super memory block of the plurality of super memory blocks, a first parity having a size equal to a size of one of the plurality of sub-data corresponding to the first parity;
    store the first parity in a parity buffer configured to store one or more parities; and
    write, when a number of parities stored in the parity buffer is equal to or greater than a first set value, the first parity stored in the parity buffer to a first parity block among a plurality of parity blocks configured to store the parities.

12. The memory controller of claim 11, wherein a value of an I-th bit, where I is a natural number, of the first parity is a value obtained by performing an XOR operation on respective I-th bit values of the plurality of sub-data.

13. The memory controller of claim 11,
    wherein each of the plurality of parity blocks is one of the plurality of super memory blocks, and
    wherein the first parity block is a second super memory block that is different from the selected first super memory block among the plurality of super memory blocks.

14. The memory controller of claim 13, wherein the control circuit is further configured to:
    set a valid parity table comprising flag information indicating whether a parity of each parity map entry included in the parity map is valid; and update the flag information corresponding to the first parity in the valid parity table.

15. The memory controller of claim 11, wherein the control circuit is further configured to:
    set a parity map comprising a set of parity map entries each indicating locations of the parities within the parity blocks and corresponding data within the super memory blocks; and
    update a parity map entry corresponding to the first parity among the set of parity map entries after the writing of the first parity into the first parity block.

16. The memory controller of claim 11, wherein the control circuit is configured to:
    restore, when an uncorrectable ECC (UECC) occurs in a first sub-data among the plurality of sub-data, the first sub-data based on the first parity and remaining sub-data except for the first sub-data among the plurality of sub-data.

17. The memory controller of claim 16, wherein the control circuit is configured to restore an I-th bit value, where I is a natural number, of the first sub-data by performing an XOR operation on an I-th bit value of the first parity and I-th bit values of the remaining sub-data except for the first sub-data among the plurality of sub-data.

18. The memory controller of claim 11, wherein the control circuit is further configured to migrate, when a number of free parity blocks among the plurality of parity blocks is equal to or less than a second set value, a valid parity among parities stored in at least one victim parity block among the plurality of parity blocks to a target parity block of the plurality of parity blocks.

19. The memory controller of claim 18, wherein the control circuit is configured to migrate the valid parity by selecting the at least one victim parity block, based on a number of invalid parities among the parities stored in each of the plurality of parity blocks.

20. A method of operating a memory controller configured to control a plurality of memory dies each including at least one memory block among a plurality of memory blocks, the method comprising:
    setting a plurality of super memory blocks from the plurality of memory blocks;
    calculating, for data stored as a plurality of sub-data in a first super memory block of the plurality of super memory blocks, a first parity having a size equal to a size of one of the plurality of sub-data corresponding to the first parity;
    storing the first parity in a parity buffer configured to store one or more parities; and
    writing, when a number of parities stored in the parity buffer is equal to or greater than a first set value, the first parity stored in the parity buffer to a first parity block among a plurality of parity blocks configured to store the parities.

* * * * *